(12) United States Patent
Kaise

(10) Patent No.: US 8,177,369 B2
(45) Date of Patent: May 15, 2012

(54) REFLECTIVE LIQUID CRYSTAL PROJECTOR AND IMAGE REPRODUCTION APPARATUS

(75) Inventor: Kikuo Kaise, Kanagawa (JP)

(73) Assignee: Sony Corporation, Tokyo (JP)

( * ) Notice: Subject to any disclaimer, the term of this patent is extended or adjusted under 35 U.S.C. 154(b) by 816 days.

(21) Appl. No.: 12/301,360

(22) PCT Filed: May 16, 2007

(86) PCT No.: PCT/JP2007/060050
§ 371 (c)(1),
(2), (4) Date: Nov. 18, 2008

(87) PCT Pub. No.: WO2007/138860
PCT Pub. Date: Dec. 6, 2007

(65) Prior Publication Data
US 2009/0161031 A1    Jun. 25, 2009

(30) Foreign Application Priority Data
May 26, 2006    (JP) .................................. 2006-146531

(51) Int. Cl.
G03B 21/14    (2006.01)
(52) U.S. Cl. .................. 353/31; 353/33; 353/94; 349/5; 349/8
(58) Field of Classification Search ............. 353/31, 353/33, 34, 37, 38, 94; 349/5, 7, 8, 9, 113
See application file for complete search history.

(56) References Cited

U.S. PATENT DOCUMENTS

| 4,900,135 | A | 2/1990 | Yuasa et al. |
| 5,737,113 | A * | 4/1998 | Kuramochi et al. .......... 359/259 |
| 6,061,111 | A * | 5/2000 | Kataoka et al. ............... 349/113 |
| 6,285,426 | B1 * | 9/2001 | Akins et al. .................... 349/114 |
| 6,330,112 | B1 * | 12/2001 | Kaise et al. .................... 359/621 |
| 6,339,459 | B1 * | 1/2002 | Ichikawa et al. ................ 349/95 |
| 6,594,090 | B2 * | 7/2003 | Kruschwitz et al. .......... 359/707 |
| 7,301,587 | B2 * | 11/2007 | Uehara et al. ................... 349/15 |
| 2007/0040965 | A1 * | 2/2007 | Kuan et al. .................... 349/113 |

(Continued)

FOREIGN PATENT DOCUMENTS
EP    0953865    11/1999
(Continued)

OTHER PUBLICATIONS
International Search Report dated May 26, 2006.
(Continued)

Primary Examiner — William C Dowling
(74) Attorney, Agent, or Firm — SNR Denton US LLP

(57) ABSTRACT

Laser light beams are diffused and shaped by diffractive optical devices such that they are introduced to corresponding pixels of a liquid crystal layer over an entire area of a display region of a reflective liquid crystal panel. The diffused and shaped laser light beams are introduced to the reflective liquid crystal panel through a field lens and a polarizing beam splitter. Red, green and blue pixels are formed on the reflective liquid crystal panel, and a microlens array is formed on an incoming and outgoing side substrate while reflecting layers corresponding to the pixels are formed on a reflection side substrate. The laser light fluxes of the colors are distributed and condensed by the microlenses and introduced to the corresponding pixels and then reflected by the corresponding reflecting layers. Refractive optical devices may be used in place of the diffractive optical devices.

5 Claims, 13 Drawing Sheets

U.S. PATENT DOCUMENTS

2007/0058135 A1 * 3/2007 Morikawa et al. .............. 353/30

FOREIGN PATENT DOCUMENTS

| | | |
|---|---|---|
| JP | 63-118125 | 5/1988 |
| JP | 04-060538 | 2/1992 |
| JP | 09160011 | 6/1997 |
| JP | 2000-112031 | 4/2000 |
| JP | 2000-347291 | 12/2000 |
| JP | 2002-139792 | 5/2002 |
| JP | 2003-066369 | 3/2003 |
| JP | 2003-147055 | 5/2003 |
| JP | 2005-526288 | 2/2005 |
| JP | 2005-099160 | 4/2005 |
| JP | 2005-116799 | 4/2005 |
| JP | 2007-058163 | 3/2007 |
| WO | 03/098916 | 11/2003 |

OTHER PUBLICATIONS

Search Report issued by the European Patent Office on May 27, 2009 in connection to related European Patent Application No. 07743485.0.

* cited by examiner

FIG. 8
(A)
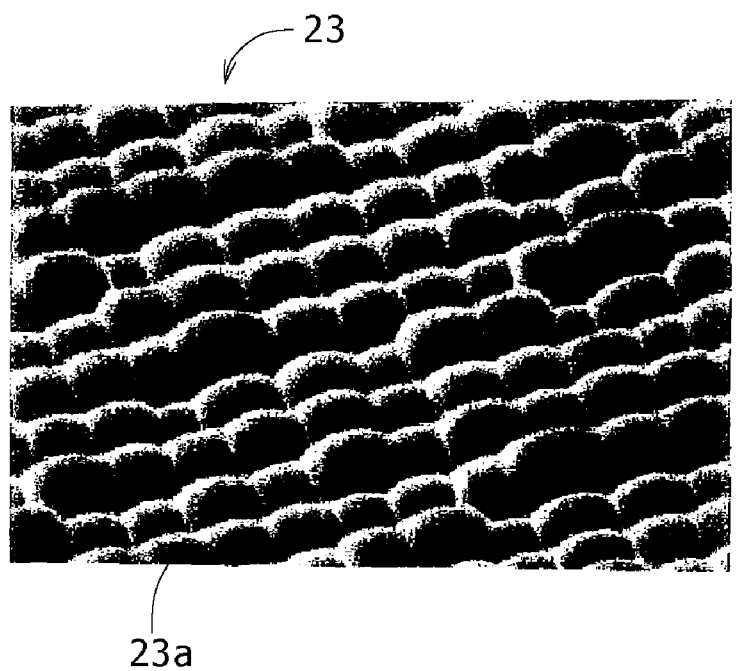
(B)
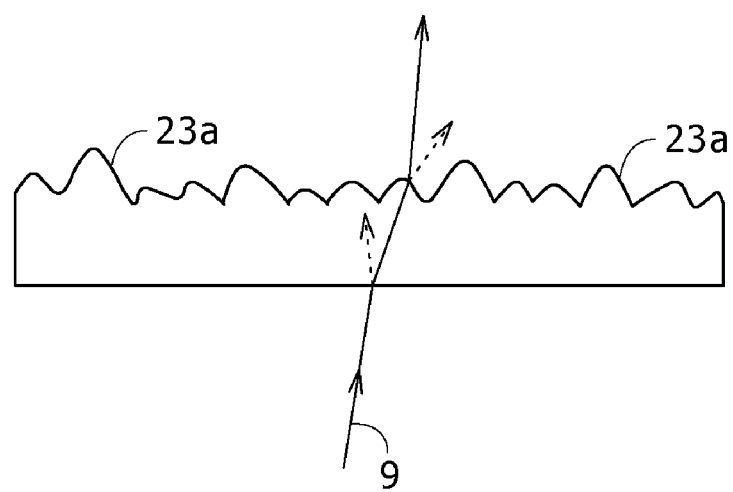

REFLECTIVE LIQUID CRYSTAL PROJECTOR AND IMAGE REPRODUCTION APPARATUS

TECHNICAL FIELD

This invention relates to a reflective liquid crystal projector and an image reproduction apparatus such as a portable telephone terminal, a digital camera, a video camera, a personal computer, a game machine or a toy wherein a reflective liquid crystal panel is used as a light valve.

BACKGROUND ART

While, as liquid crystal projectors (projectors wherein a liquid crystal panel is used as a light valve), those which use a transmissive liquid crystal panel and those which use a reflective liquid crystal panel are available, it is considered that conventionally liquid crystal projectors of both types are usually installed and used in a house and the like. As disclosed in Patent Document 1 (Japanese Patent Application Laid-Open No. Sho 63-118125) or Patent Document 2 (Japanese Patent Application Laid-Open No. Hei 4-60538), a lamp such as a metal halide lamp, a high-pressure mercury lamp or a xenon lamp is used as the light source.

However, where a lamp is used as the light source, there are such problems as (a) the aperture of the light source section becomes large and the overall size of the projector becomes large, (b) a cooling apparatus such as a fan is required and the overall size of the projector becomes larger, (c) noise by the fan and so forth is loud and also the power consumption is high, (d) light in an unnecessary and harmful wavelength region such as ultraviolet rays is irradiated, resulting in the possibility that the reliability of the liquid crystal panel for which an organic substance is used may be spoiled, (e) the light source cannot be turned on and off at a high speed and also the adjustment of the light amount is difficult, (f) exchange of the lamp is required frequently due to disconnection or the life of the lamp, and so forth.

Therefore, an idea is considered to use a light emitting device (luminous element) other than a lamp as the light source of a liquid crystal projector.

In particular, Patent Document 3 (Japanese Patent Application Laid-Open No. 2005-116799) and Non-Patent Document 1 (G. Harbers, M. Keuper, S. Paolini; "Performance of High Power LED Illuminators in Color Sequential Projection Displays", IDW '03 p. 1585 to p. 1588) discloses that an LED (light emitting diode) is used as the light source.

Further, Patent Document 4 (JP-T-2005-526288) discloses that a laser is used as the light source such that pumping thereof is controlled for each pixel in a raster pattern and a laser beam emitted from the laser is scanned on the raster pattern by means of a scanner composed of two scanning mirrors to display a two-dimensional image on the raster pattern.

As for the laser, solid-state lasers such as a semiconductor laser, a so-called LD and a solid-state laser (DPSSL: Diode Pumped Solid State Laser) which is pumped by a semiconductor laser have been implemented, and as regards the size, the semiconductor laser can be formed such that the length of one side thereof is approximately several hundreds μm, and with nonlinear optical crystal of the solid-state laser, the size can be made approximately several mm at the 100 mW output class.

Further, the semiconductor laser or the solid-state laser has a long life in comparison with the metal halide lamp and so forth and hardly requires replacement, and is high in light emission efficiency, low in heat generation and easy to cool.

Further, the semiconductor laser or the solid-state laser can be configured so as to emit light of wavelengths optimum for display within wavelength regions of red, green and blue depending upon the type and the composition of crystal, thereby the color purity is enhanced and light unnecessary for display such as infrared rays and ultraviolet rays is not emitted.

Furthermore, the semiconductor laser or the solid-state laser can carry out on/off switching in a moment thereby able to readily control the amount of light to be emitted.

DISCLOSURE OF INVENTION

If an LED is used as the light source of a liquid crystal projector as disclosed in Patent Document 3 (Japanese Patent Application Laid-Open No. 2005-116799) and Non-Patent Document 1 (G. Harbers, M. Keuper, S. Paolini; "Performance of High Power LED Illuminators in Color Sequential Projection Displays", IDW '03 p. 1585~p. 1588), then the light source section can be reduced in size and the overall size of the projector can be reduced in comparison with a case where a lamp is used as the light source. Nevertheless, the limit to reduction of the size of the entire projector is such a size that the projector can be placed on the "palm of the hand", and it is difficult to build the projector in a small-sized apparatus such as a portable telephone terminal.

Moreover, as pointed out also in Patent Document 3 (Japanese Patent Application Laid-Open No. 2005-116799), the LED emits light with a large angle of divergence, and where it is used as the light source of a liquid crystal projector, the etendue (Etendue) becomes excessively large in comparison with the display region of the liquid crystal panel. As a result, the light utilization efficiency drops.

In contrast, the semiconductor laser or the solid-state laser itself can be reduced in size, and besides, when compared with the LED, the angle of divergence of light to be emitted can be overwhelmingly small and the light utilization efficiency can be significantly improved.

This is because, since, when compared with the LED, the laser light source becomes closer to a point source of light, optimization of the etendue becomes simple and the light utilization efficiency rises, and as a result, the light emission amount of the light source required to achieve an approximately equal light amount with a projector can be reduced in comparison with that in an alternative case wherein the LED is used as the light source.

As a result, where a laser is used as the light source, the cooling apparatus can be simplified or can be eliminated.

However, as disclosed in Patent Document 4 (JP-T-2005-526288), with the method of causing a laser beam to be raster scanned by means of a scanner, although black display is implemented by turning off the laser beam, it is difficult to momentarily place the laser beam into a state wherein it is not emitted at all (turning the light amount to zero) while the laser beam is modulated at a high speed. As a result, the method has a drawback that the image contrast drops.

Therefore, it is an object of the present invention to make it possible to miniaturize an entire projector, particularly a reflective liquid crystal projector, to such a degree that it can be built in a small-sized apparatus such as a portable telephone terminal and realize enhancement of the light utilization efficiency and enhancement of the image contrast which are essential for a projector.

A reflective liquid crystal projector of the present invention where it is configured as that of the single plate type for the three colors of red, green and blue for solving the subject described above includes:

a light source section having first, second and third lasers each formed from a semiconductor laser or a solid-state laser and configured to emit laser light beams of red, green and blue, respectively; a reflective liquid crystal panel including a liquid crystal layer formed between an incoming and outgoing side substrate and a reflection side substrate and forming pixels for red, green and blue, a microlens array formed on the incoming and outgoing side substrate and formed from a large number of microlenses, and reflecting layers formed corresponding to the pixels on the reflection side substrate;

a light beam diffusing and shaping optical device configured to diffuse and shape the laser light beams emitted from the light source section by diffraction or refraction of the light such that the laser light beams are introduced to the corresponding pixels of the liquid crystal layer over an overall area of a display region of the reflective liquid crystal panel;

a lens system configured to convert the laser light beams of the colors diffused and shaped by the light beam diffusing and shaping optical device into beams of substantially parallel light;

an optical device configured to transmit or reflect the laser light beams of the colors converted into the beams of substantially parallel light by the lens system so as to introduce the laser light beams of the colors from the incoming and outgoing side substrate to the reflective liquid crystal panel and further introduce the laser light beams of the colors to the liquid crystal layer through the microlenses; and a projection lens configured to project the image light beams of the colors reflected, after transmitted through the liquid crystal layer, by the reflecting layers, transmitted through the liquid crystal layer again, emerging from the incoming and outgoing side substrate through the microlenses and reflected by the optical devices or transmitted through the optical device.

In the reflective liquid crystal projector having the configuration described above, the red, green and blue laser light beams emitted from the first, second and third lasers of the light source section are diffused and shaped by the light beam diffusing and shaping optical device of the diffraction type or the refraction type such that the laser light beams are introduced to the corresponding pixels of the liquid crystal layer over an overall area of the display region of the single reflective liquid crystal panel. As a result, a multi-color image including red, green and blue is projected on the external screen.

Besides, each of the first, second and third lasers is a semiconductor laser or a solid-state laser and can be miniaturized significantly, and also the light beam diffusing and shaping optical device of the diffraction type or the refraction type can be miniaturized sufficiently. Therefore, the entire projector can be miniaturized significantly and can be built in a small-sized apparatus such as a portable telephone terminal.

Further, since laser light is used as illuminating light, the light utilization efficiency is improved. Further, black display is implemented not by turning off the laser light beams of the colors but by intercepting a corresponding display unit of the liquid crystal layer composed of pixels for red, green and blue by means of a liquid crystal driving circuit. Therefore, the image contrast does not drop.

Further, unlike the laser scanning system disclosed in Patent Document 4, image light modulated by the liquid crystal panel is projected in an enlarged scale as divergent light by the projection lens. Therefore, the screen image provides little flickering feeling, and there is an advantage that a "calm" image unique to the liquid crystal is obtained.

As described above, according to the present invention, particularly in the reflective liquid crystal projector, the entire projector can be miniaturized to such a degree that it can be built in a small-sized apparatus such as a portable telephone terminal, and enhancement of the light utilization efficiency and improvement of the image contrast which are essentially required for a projector can be implemented.

BRIEF DESCRIPTION OF DRAWINGS

FIG. 8 is a view illustrating a manner of diffusing and shaping of a refractive optical device.

BEST MODE FOR CARRYING OUT THE INVENTION

1. First Embodiment (Single Plate Type): FIGS. 1 to 10

As a first embodiment, a case of a single plate type which uses a single reflective liquid crystal panel for the three colors of red, green and blue is described.

1-1. First Example

FIGS. 1 to 6

Figure 1:
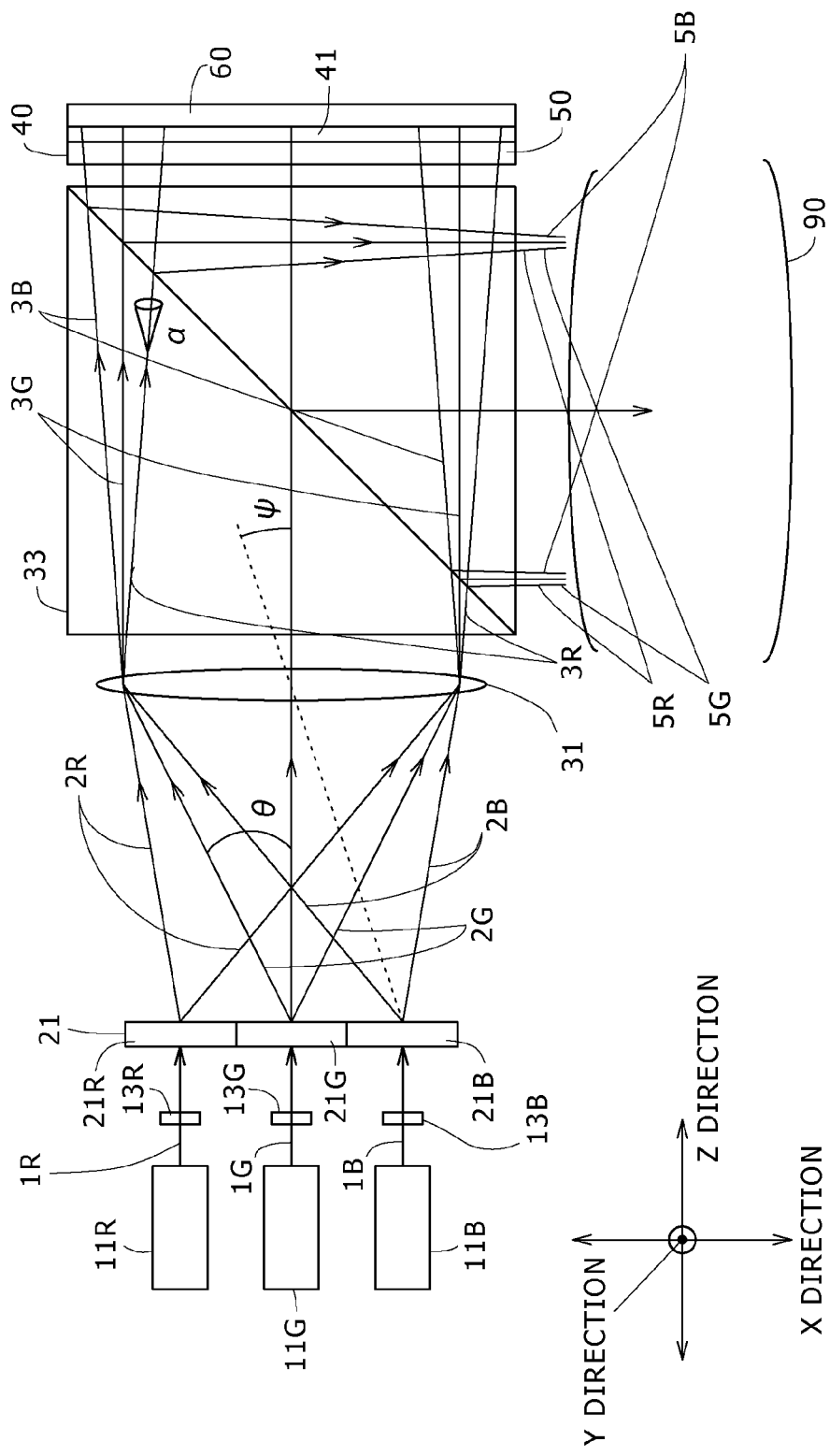
FIG. 1 is a view showing a first example of a reflective liquid crystal projector of the single plate type.

FIG. 1 shows a case wherein a diffractive optical device is used as a light beam diffusing and shaping optical device as a first example of a reflective liquid crystal projector of the single plate type.

In order to make directions definite, an X direction, a Y direction and a Z direction are defined as shown in the figure. The Y direction is, in FIG. 1, a direction perpendicular to the plane of the figure.

<Light Source Section>

In the present example, a red laser 11R, a green laser 11G and a blue laser 11B are provided and arrayed in the X direction.

For each of the red laser 11R and the blue laser 11B, a semiconductor laser is used. For example, for the red laser 11R, a laser of the InGaAsP-based type or the InAlGaP-based type is used, and for the blue laser 11B, a laser of the GaN-based type or the InGaN-based type is used.

On the other hand, since a semiconductor laser which emits green laser light is not yet implemented at present, for the green laser 11G, a solid-state laser which is pumped by a semiconductor laser, a so-called DPSS (Diode Pumped Solid State) laser, for example, a $YVO_4$+KTP(KTiOPO$_4$), a crystal PPLN (Periodically Poled LiNbO$_3$), a PP (Periodically Poled) MgO.LN(LiNbO$_3$) or the like, is used.

The oscillation mode of the red laser 11R, green laser 11G and blue laser 11B may be a multi-mode. Although, in order to achieve mode stability or polarization stability against a temperature variation or the like, it is sometimes intended to achieve, with the semiconductor laser, transverse mode stabilization by a narrow stripe width and achieve, with the solid-state laser, polarization stabilization by periodical polarization reversal (periodically poled), according to the present invention, a multi-mode semiconductor laser or a solid-state laser can be used for the red laser 11R, green laser 11G and blue laser 11B depending upon the insensitivity of a light beam diffusing and shaping optical device (diffractive optical device or refractive optical device) hereinafter described to the shape of an incoming light beam.

Naturally, a semiconductor laser or a solid-state laser of the single mode may be used. Generally, in the case of a semiconductor laser, the yield of semiconductor lasers which can be used is enhanced and the production cost decreases by making it possible to utilize also multi-mode oscillation rather than to carry out mode control.

As an example, an InAlGaP-based semiconductor laser of an oscillation frequency of 635 nm to 640 nm is used for the red laser 11R, and an AlGaN-based semiconductor laser of an oscillation frequency of 445 nm is used for the blue laser 11B. In both of the semiconductor lasers, the output is 100 mW, the angle of divergence of light in the vertical direction is 30 degrees (FWHM), the angle of divergence of light in the horizontal direction is 10 degrees, the transverse mode is the single mode, and the vertical mode is the multi-mode.

For the green laser 11G, a solid-state laser pumped by a semiconductor laser of 808 nm, having an oscillation wavelength of 532 nm and utilizing $YVO_4$+KTP second-order harmonics is used. The output is 100 mW, the transverse mode is the single mode, and the vertical mode is the multi-mode.

While the parallelism of the laser light beams 1R, 1G and 1B is important in order to control the incoming angle of laser light beams 2R, 2G and 2B diffused and shaped by a diffractive optical device 21 hereinafter described to a field lens 31, the parallelism is controlled so as to fall within one degree in both of the X direction and the Y direction. In particular, while the laser beams are oscillated, they are controlled so as to satisfy such parallelism as described above by a so-called active alignment method.

the laser light beams 1R, 1G and 1B of red, green and blue emitted from the red laser 11R, green laser 11G and blue laser 11B are transmitted, for example, through $\lambda/2$ plates (half-wave plates) 13R, 13G and 13B, respectively, and introduced to the diffractive optical device 21.

The polarization direction of a laser beam emitted from a semiconductor laser or a solid-state laser is not necessarily fixed for each device due to variation of the laser internal electric field, and the polarization direction is dispersed also by the assembly accuracy of the device. However, by inserting the $\lambda/2$ plates 13R, 13G and 13B in this manner and adjusting the rotational position thereof, the polarization directions of laser light beams 3R, 3G and 3B of the colors incoming to a reflective liquid crystal panel 40 hereinafter described can be aligned with the polarization axis of the reflective liquid crystal panel 40.

A suitable phase difference film or phase difference plate may be used for correcting the polarization direction in place of the $\lambda/2$ plate. For example, a solid-state laser of the AlGaAs-based semiconductor laser pumped $YVO_4$+KTP second-order harmonics utilization type which is utilized popularly changes the polarization direction for each device and in most cases has a polarization ratio of approximately 10. In such an instance, the polarization ratio can be set high by using an appropriate phase difference film to compensate for and optimize the retardation value.

By adjusting the polarization axis by means of a $\lambda/2$ plate, a phase difference film or the like in this manner, the reflective liquid crystal panel 40 eliminates the necessity for a polarizing plate and can reduce the loss of light, and such a situation that a shadow of dust sticking to a polarizing plate is projected can be prevented.

<Diffractive Optical Device as the Light Beam Diffusing Shaping Optical Device>

In the present embodiment, while a laser light beam emitted from a semiconductor laser or a solid-state laser as the light source of a reflective liquid crystal projector is diffused and shaped by a light beam diffusing and shaping optical device of the diffraction type or the refraction type so as to cover the overall area of the display region of the reflective liquid crystal panel, the example of FIG. 1 illustrates a case wherein a diffractive optical device is used as the light beam diffusing and shaping optical device.

The diffractive optical device (DOE: Diffractive optical device) itself is known as "Diffuser" or "Beam Shaper."

For example, reference document 1 (Adam Fedor; Digital Optics Corp. "Binary Optic Diffuser Design") discloses that a light beam is diffused and shaped by a "Diffuser" or a "Beam Shaper", and reference document 2 (Yasushi IKEDA "Diffraction Type Lens"; OPTRONICS 2005 No. 3, pp. 175 to 178) discloses a fabrication method of a "diffraction type lens" and so forth.

The "Diffuser" diffracts light at individual points of an incident light beam to individual points on an output plane (Output Plane) such that light at a certain point of the incident light beam is diffracted to a large number of points on the output plane (1:N mapping). The "Beam Shaper" diffracts light at individual points of an incident light beam to individual points on an output plane such that light at a certain point of the incident light beam is diffracted to a certain point on the output plane (1:1 mapping).

In the example of FIG. 1, as the diffractive optical device 21, a diffractive optical device 21R for red, a diffractive optical device 21G for green and a diffractive optical device 21B for blue of the transmission type are provided and arrayed in the array direction of the red laser 11R, green laser 11G and blue laser 11B.

The diffractive optical device 21R for red diffuses and shapes the red laser light beam 1R emitted from the red laser 11R such that it enters pixels for red (sub pixels for displaying red) of a liquid crystal layer 41 of the reflective liquid crystal panel 40 in such a manner as hereinafter described over an overall area of the display region of the reflective liquid crystal panel 40 as indicated by the laser light beams 2R and 3R.

Similarly, the diffractive optical device 21G for green diffuses and shapes the green laser light beam 1G emitted from the green laser 11G such that it enters pixels for green (sub pixels for displaying green) of the liquid crystal layer 41 of the reflective liquid crystal panel 40 over the overall area of the display region of the reflective liquid crystal panel 40 as indicated by the laser light beams 2G and 3G, and the diffractive optical device 21B for blue diffuses and shapes the blue laser light beam 1B emitted from the blue laser 11B such that it enters pixels for blue (sub pixels for displaying blue) of the liquid crystal layer 41 of the reflective liquid crystal panel 40 over the overall area of the display region of the reflective liquid crystal panel 40 as indicated by the laser light beams 2B and 3B.

Figure 2:
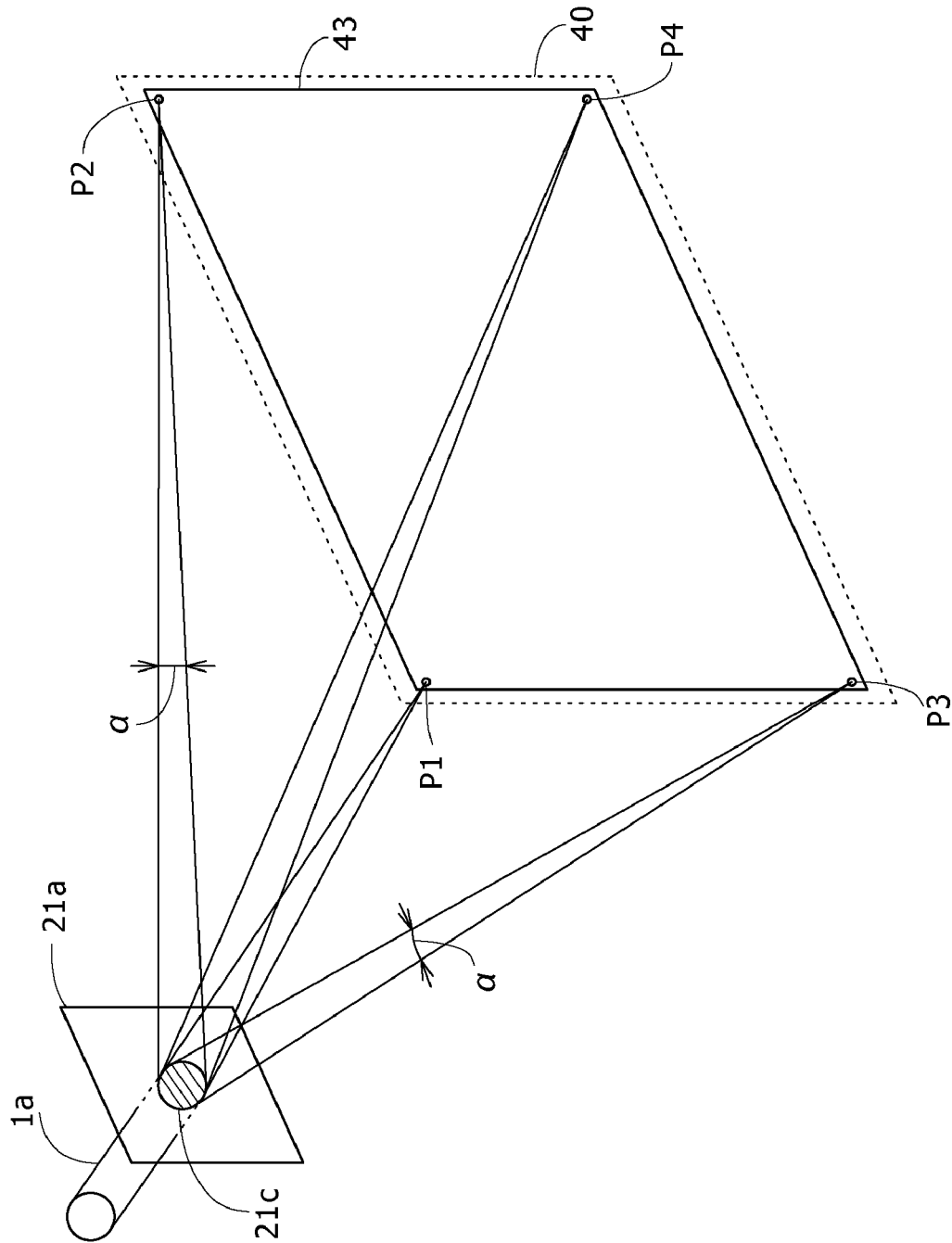
FIG. 2 is a view illustrating a manner of diffusing and shaping by a diffractive optical device.

Namely, for example, if the diffractive optical device 21R for red, diffractive optical device 21G for green and diffractive optical device 21B for blue are each formed from a Diffuser, as shown in FIG. 2 (it is to be noted that, in FIG. 2, refraction of light by the field lens 31 shown in FIG. 1 and a polarizing beam splitter 33 shown in FIG. 1 are omitted), a diffractive optical device 21a for a certain color diffracts a laser light beam 1a incident to a diffraction pattern formation section 21c to an overall area of a display region 43 of the reflective liquid crystal panel 40 including points P1, P2, P3 and P4 at the individual corners by such mapping as described above, and the entire diffractive optical device 21 is generally configured such that diffracted light beams of the individual colors from the diffractive optical devices 21R, 21G and 21B are diffused into dots and are uniformized such that the dots overlap with each other on the display region 43 and irradiate the display region 43.

A laser light beam emitted from a laser generally has a Gaussian shape in which it is difficult for the laser light beam to be irradiated on the reflective liquid crystal panel 40 uniformly. However, by diffusing and shaping the laser light beam by means of the diffractive optical device 21 so as to be irradiated on the reflective liquid crystal panel 40 in this manner, a uniform luminance distribution can be obtained on the reflective liquid crystal panel 40.

The diffractive optical devices 21R, 21G and 21B for the individual colors are preferably formed in an integrated form on one transparent substrate. By this, it is possible to carry out positioning of the diffractive optical devices 21R, 21G and 21B readily and accurately and miniaturize the entire diffractive optical device 21 in comparison with those in a case wherein the diffractive optical devices 21R, 21G and 21B are positioned and disposed after they are formed separately.

Such a diffractive optical device 21 as described above can be produced after a computer simulation is carried out based on the beam diameter or beam shape of the laser light beams 1R, 1G and 1B for the individual colors, a luminance distribution on a screen to be obtained and so forth.

In the example of FIG. 1, $$\tan \theta = d/D \quad (1)$$

$$\tan \psi = (L - E \cdot \sin \beta)/D \quad (2)$$

$$\tan \alpha = \phi/D \quad (3)$$

are satisfied.

Here

E: distance between the lasers 11R, 11G and 11B and the diffractive optical device 21,
$\phi$: beam diameter of the laser light beam 1G,
L: distance between the laser light beam 1G and the laser light beam 1R or 1B,
$\beta$: parallelism (inclination angle) of the laser light beam 1R or 1B with respect to the laser light beam 1G,
$\theta$: diffusion angle of the laser light beam 2G,
D: distance between the diffractive optical device 21 and the field lens 31,
d: diffusion distance of the laser light beam 2G on the field lens 31
$\psi$: incident angle of light to the reflective liquid crystal panel 40
$\alpha$: diffusion angle of light on the reflective liquid crystal panel 40

All of the values are in-the-air conversion values.

The parallelism (inclination angle) $\beta$ is within one degree as described above. The diffusion angle $\theta$ is equal to or smaller than approximately 15 degrees, and the light incident angle $\psi$ is approximately seven to nine degrees.

Further, since each of the lasers 11R, 11G and 11B is regarded as a quasi-point source of light, the light diffusion angle $\alpha$ can be made sufficiently small like $\pm 1°$ or less.

Accordingly, the irradiation light amount on the screen can be increased significantly compared to a case wherein a lamp is used as the light source, and the light utilization efficiency can be improved to approximately 30% even with a reflective liquid crystal projector of the single plate type. Therefore, the laser output can be reduced and heat generation by each laser can be suppressed. A reflective liquid crystal projector with such a high efficiency has not existed heretofore.

<Optical System Between the Diffractive Optical Device and the Reflective Liquid Crystal Panel>

As shown in FIG. 1, the field lens 31 is disposed forwardly of the diffractive optical device 21 such that the red laser light beam 2R diffused and shaped by the diffractive optical device 21R for red, the green laser light beam 2G diffused and shaped by the diffractive optical device 21G for green, and the blue laser light beam 2B diffused and shaped by the diffractive optical device 21B for blue are converted into laser light beams 3R, 3G and 3B, respectively, which are substantially parallel to each other.

Further, the polarizing beam splitter 33 is disposed forwardly of the field lens 31 such that the laser light beams 3R, 3G and 3B converted into substantially parallel light by the field lens 31 are transmitted through the polarizing beam splitter 33 and enter the reflective liquid crystal panel 40.

<Reflective Liquid Crystal Panel>

In the reflective liquid crystal panel 40, a liquid crystal layer 41 is formed between an incoming and outgoing side substrate 50 and a reflection side substrate (backplane) 60, and a microlens array is formed on the incoming and outgoing side substrate 50 while a reflecting layer is formed on the reflection side substrate 60.

Figure 3:
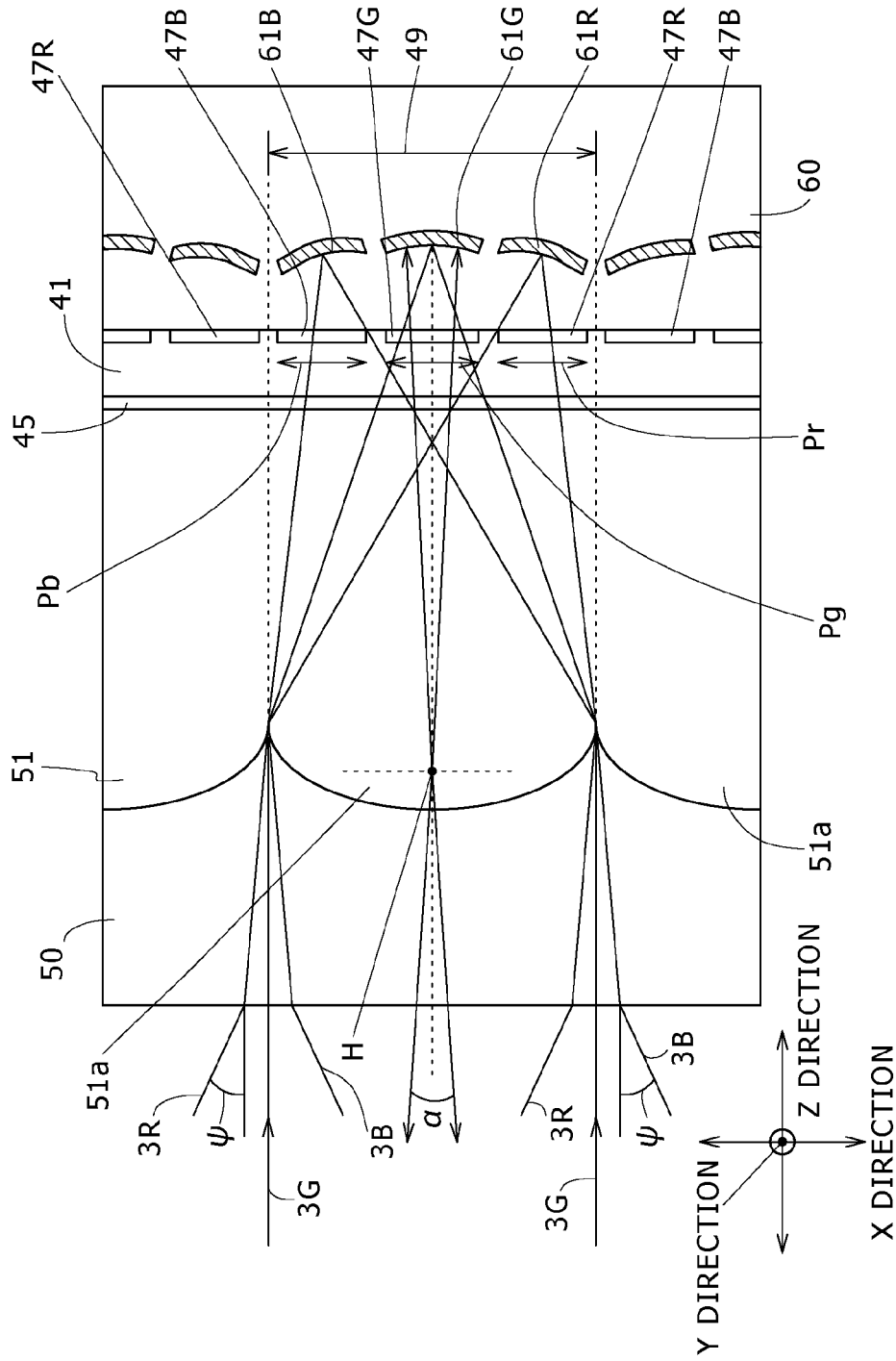
FIG. 3 is a view showing an example of a reflective liquid crystal panel.
Figure 4:
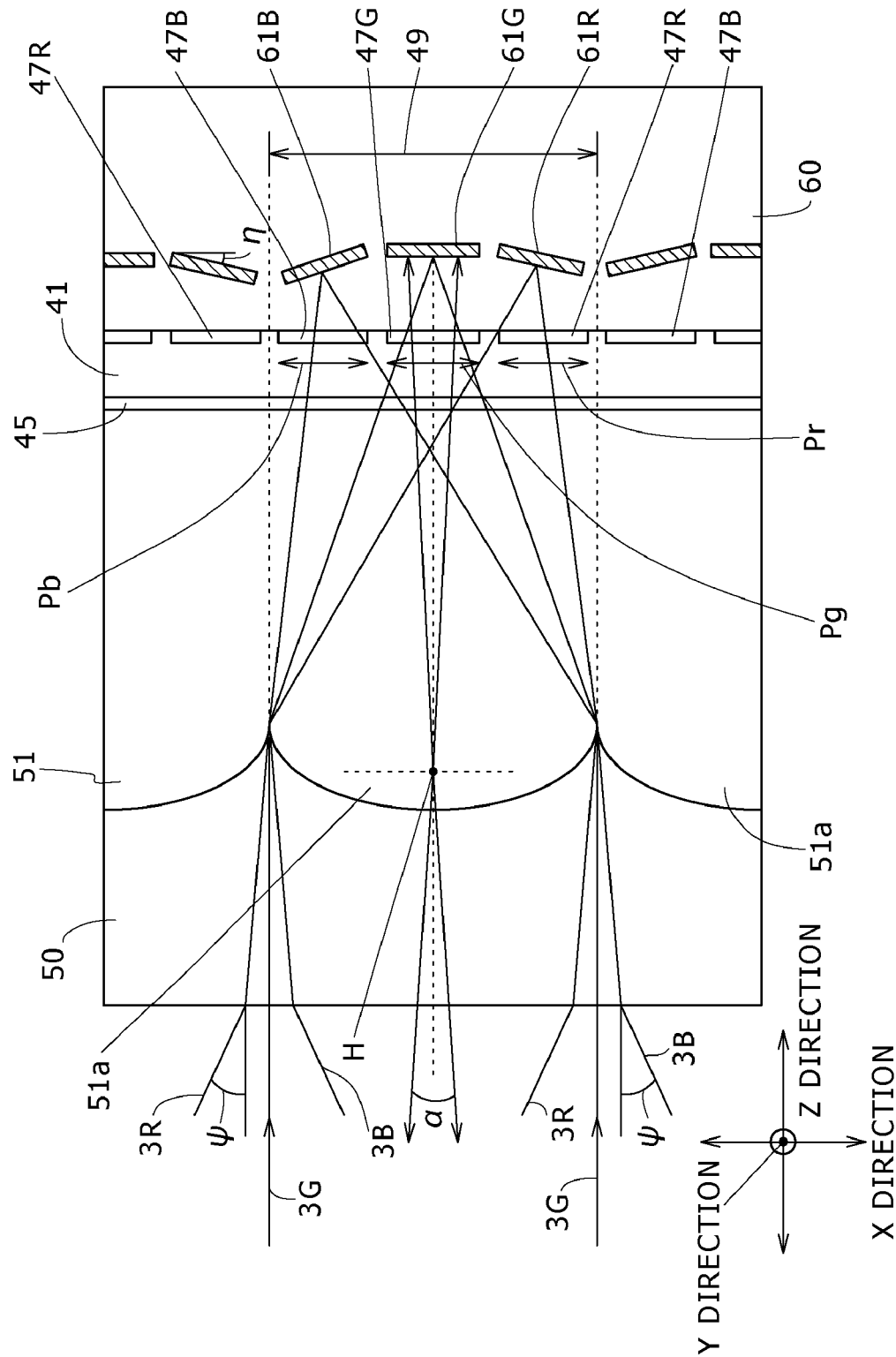
FIG. 4 is a view showing another example of a reflective liquid crystal panel.

As an example, as shown in FIG. 3 or 4, the incoming and outgoing side substrate 50 is configured such that a microlens array 51 wherein a large number of microlenses 51a are arrayed is formed from a transparent resin or the like on a transparent substrate made of quartz or the like, and an opposing common electrode 45 made of a transparent conductive material such as ITO (Indium Tin Oxide) is formed on the rear face side.

The reflection side substrate 60 is configured such that a liquid crystal driving circuit of the active matrix type omitted in FIGS. 3 and 4 is formed on one face side of a support substrate made of quartz, single crystal silicon or the like using TFTs (Thin Film Transistors), and a large number of sets of reflecting layers 61R, 61G and 61B are formed in an array on the liquid crystal driving circuit while a large number of sets of pixel electrodes 47R, 47G and 47B made of a transparent conductive material such as ITO are formed in an array on the front face side.

As the reflective liquid crystal panel 40, the incoming and outgoing side substrate 50 and the reflection side substrate 60 are disposed in such a manner that a small gap is formed therebetween with the opposing common electrode 45 and the pixel electrodes 47R, 47G and 47B opposed to each other and liquid crystal is injected between them to form the liquid crystal layer 41 thereby to form pixels (sub pixels for red display) Pr for red, pixels (sub pixels for green display) Pg for green and pixels (sub pixels for blue display) Pb for blue. The liquid crystal mode may be a normal mode of the reflective liquid crystal such as the ECB mode.

Figure 5:
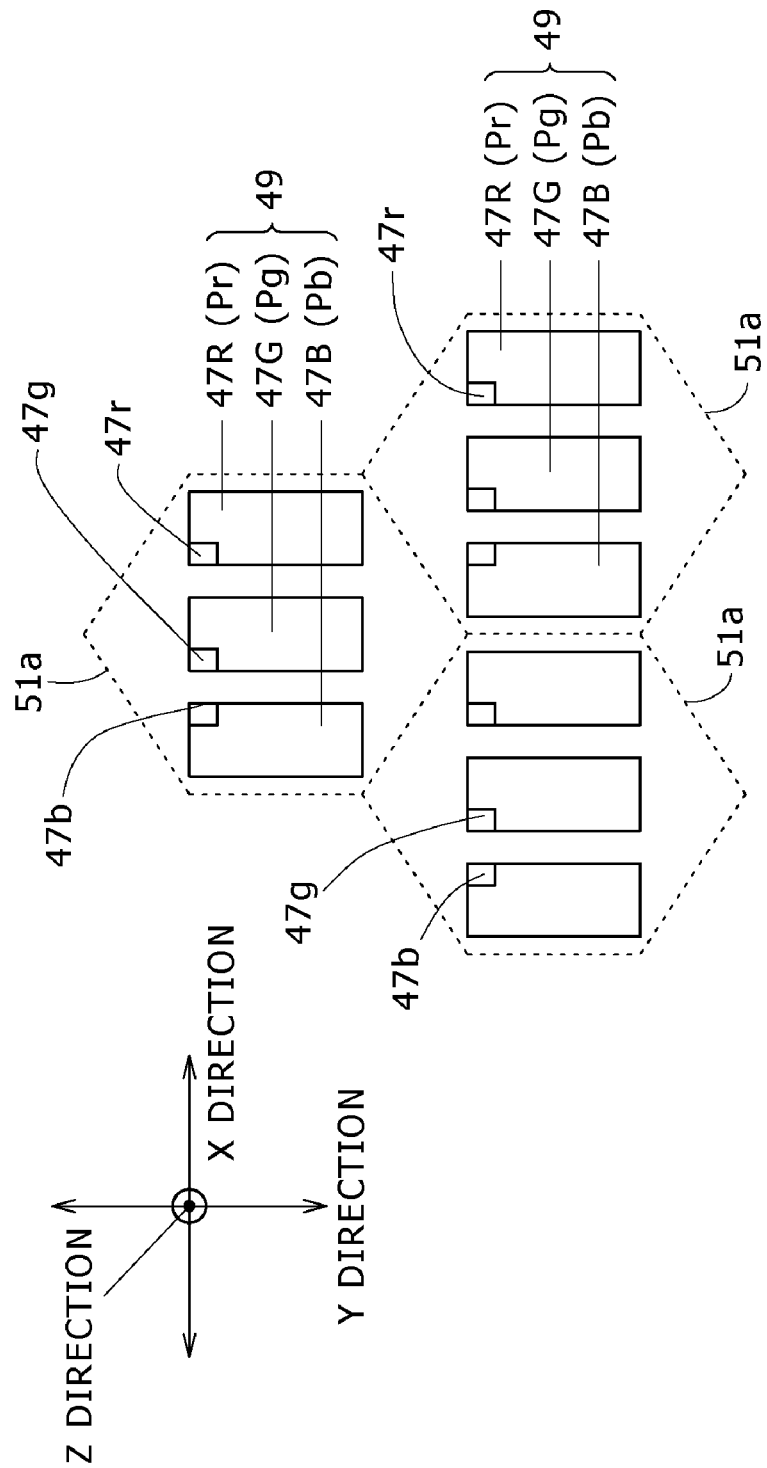
FIG. 5 is a view showing an example of an array pattern of pixels.
Figure 6:
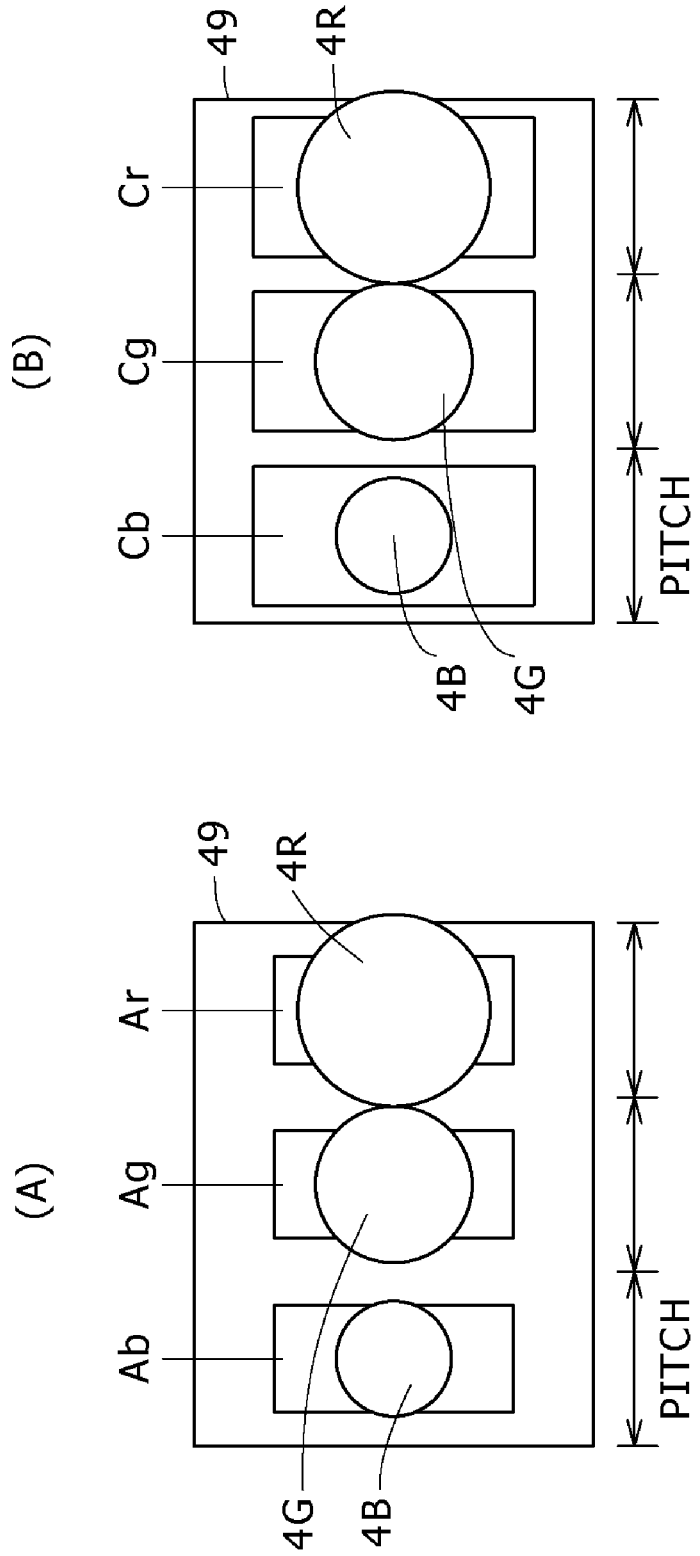
FIG. 6 is a view illustrating a case of the transmission type and a case of the reflection type for comparison.

In this instance, display units 49 each formed from a set of pixels Pr, Pg and Pb (set of pixel electrodes 47R, 47G and 47B) are arrayed, as viewed from the incoming side of the laser light beams, in such a Δ array (array wherein the center of each of the display units 49 is positioned at a vertex of a triangle) as shown in FIG. 5 or in a square array (array wherein pixels of the same color are arrayed in the Y direction).

Where the display units 49 are arrayed in the Δ array as seen in FIG. 5, the microlenses 51a are formed at a ratio of one to one display unit 49 such that they have a hexagonal shape as viewed from the incoming side of the laser light beams as shown in FIG. 5. Where the display units 49 are arrayed in the squire array, the microlenses 51a are formed at a ratio of one to one display unit 49 such that they have a rectangular shape (square shape or oblong shape) as viewed from the incoming side of the laser light beams.

Further, where the display units 49 are arrayed in the square array and light source images on the pixels Pr, Pg and Pb are formed such that each of them is not formed as a dot (spot) for each pixel but as a line (slit) extending in the Y direction, the microlenses 51a may be formed as cylindrical lenses extending in the Y direction.

Since the laser light beams 3R, 3G and 3B incident on the reflective liquid crystal panel 40 are converted into beams of substantially parallel light individually by the field lens 31, each of the microlenses 51a is preferably formed with an aspheric surface in order to suppress spherical aberration.

While the pixel electrodes 47R, 47G and 47B and the reflecting layers 61R, 61G and 61B are electrically connected to each other, respectively, contact therebetween is carried out at corner portions 47r, 47g and 47b of the pixel electrodes 47R, 47G and 47B, respectively, as shown in FIG. 5.

FIG. 3 illustrates a case wherein the reflecting layers 61R, 61G and 61B are each formed, on a spherical face of a radius of a distance equal to or slightly smaller than the focal distance of a corresponding microlens 51a, centered at a principal point H of the microlens 51a, as a concave curved mirror having a same spherical shape. Such curved mirrors can be formed by forming the surface of an insulating layer as spherical faces by etching or the like and producing an aluminum layer on the spherical faces as hereinafter described.

As an example, when such an oblique light flux whose incident angle is indicated by ψ and whose dispersion angle is indicated by α in FIGS. 1 and 3 is incident, in order for returning light reflected by a curved mirror as the reflecting layer to be included in an effective utilization range of the polarizing beam splitter 33, it is desirable to satisfy the condition of the following expression (4).

$$0.9f \leq R \leq f \quad (4)$$

where
R: radius of the spherical face described above centered at the principal point H of the microlens 51a,
f: focal distance of the microlens 51a.

The expression (4) represents that, as a result of an experiment, the radius R of the curved mirror as a reflecting layer preferably is equal to or greater than 90% but equal to or smaller than 100% of the focal distance f of the microlens 51a.

The focal distance f of the microlens 51a is equal to or greater than approximately 100 μm by the in-the-air conversion value from the principal point H; the distance from the principal point H of the microlens 51a to the opposing common electrode 45 is equal to or smaller than approximately 120 μm by the actual distance in the material, and the width of the pixels Pr, Pg and Pb (pixel electrodes 47R, 47G and 47B, reflecting layers 61R, 61G and 61B) in the X direction is approximately 6 to 10 μm.

According to this, the laser light beams 3R, 3G and 3B of red, green and blue emitted from the red laser 11R, green laser 11G and blue laser 11B, diffused and shaped by the diffractive optical device 21R for red, diffractive optical device 21G for green and diffractive optical device 21B for blue, respectively, converted into beams of substantially parallel light by the field lens 31, transmitted through the polarizing beam splitter 33 and entering the incoming and outgoing side substrate 50 of the reflective liquid crystal panel 40 are distributed and condensed by the microlenses 51a, transmitted through the corresponding pixels Pr, Pg and Pb (pixel electrodes 47R, 47G and 47B) of the liquid crystal layer 41, reflected by the corresponding reflecting layers 61R, 61G and 61B, transmitted in the reversed direction through the same pixels Pr, Pg and Pb, going out in the reverse direction from the same microlenses 51a and entering the polarizing beam splitter 33 in a state wherein the light diffusion angle α described above is maintained at a substantially equal value.

Namely, the diffractive optical device 21R for red described above diffuses and shapes the red laser light beam 1R emitted from the red laser 11R such that the red laser light beam 1R is finally introduced to the pixels Pr for red of the liquid crystal layer 41 through the microlenses 51a. The diffractive optical device 21G for green diffuses and shapes the green laser light beam 1G emitted from the green laser 11G such that the green laser light beam 1G is finally introduced to the pixels Pg for green of the liquid crystal layer 41 through the microlenses 51a. The diffractive optical device 21B for blue diffuses and shapes the blue laser light beam 1B emitted from the blue laser 11B such that the blue laser light beam 1B is finally introduced to the pixels Pb for blue of the liquid crystal layer 41 through the microlenses 51a.

A red image signal is applied to the pixels Pr of the liquid crystal layer 41 to modulate and control the transmission factor of the pixels Pr, and a green image signal is applied to the pixels Pg of the liquid crystal layer 41 to modulate and control the transmission factor of the pixels Pg while a blue image signal is applied to the pixels Pb of the liquid crystal layer 41 to modulate and control the transmission factor of the pixels Pb.

Accordingly, red image light is obtained as laser light having been transmitted through the pixels Pr, and green image light is obtained as laser light having been transmitted through the pixels Pg while blue light is obtained as laser light having been transmitted through the pixels Pb.

The reflecting layers 61R, 61G and 61B may not entirely extend along the spherical faces as shown in FIG. 3 but may be curved with a radius a little greater (with a radius of curvature a little smaller) than that in the case of FIG. 3.

Or, as shown in FIG. 4, each of the reflecting layers 61R, 61G and 61B may be formed as a plane (flat plate) while the reflecting layers 61R and 61B on the opposite sides are inclined by an angle η in the opposite direction to that of the central reflecting layer 61G so that the reflecting layers 61R, 61G and 61B are positioned approximately on the spherical faces. The angle η is in the range from approximately 3 to 5°.

In this instance, though not shown in FIG. 4, there is a possibility that light reflected by the reflecting layers 61R, 61G and 61B may leak to an adjacent pixel (sub pixel) or display unit. However, since the light diffusion angle α is approximately ±1 degree and sufficiently small, the leaking light amount is small, and the decrease of the color purity by color mixture is little.

<Projection by the Projection Lens>

As shown in FIG. 1, image light fluxes (reflected laser light beams) 5R, 5G and 5B emitted from the reflective liquid crystal panel 40 in such a manner as described above are reflected by the polarizing beam splitter 33 and projected generally as multiple-color image light on a screen externally of the projector by a projection lens 90. The projection lens 90 is a combination of a plurality of lenses. A multi-color image is shown on the screen thereby.

<Effects>

Since the reflective liquid crystal projector of the single plate type described above uses the red laser 11R, green laser 11G and blue laser 11B each formed from a semiconductor laser or a solid-state laser and also uses the diffractive optical devices 21R, 21G and 21B for the individual colors, the light source section and the optical system of the entire projector can be miniaturized remarkably.

Although the maximum diffraction angle of the diffractive optical devices 21R, 21G and 21B has a tradeoff (trade off) relationship with the uniformity of the luminance on the reflective liquid crystal panel 40, it can be increased to approximately 30 degrees as long as the uniformity of the luminance is not lost. Consequently, the distance between the diffractive optical device 21 and the field lens 31 can be reduced, and the length of the entire projector can be reduced.

In particular, the optical system of the entire projector can be reduced in size to approximate 1 cm in width in the X direction and the Y direction except the projection lens 90, to approximately 3.5 cm in length in the Z direction and to approximately several $cm^3$ to 10 $cm^3$ in volume.

Further, since the laser light source composed of the red laser 11R, green laser 11G and blue laser 11B is used as the light source, the light diffusion angle α can be made sufficiently small like ±1 degree or less as described above, and the light utilization efficiency can be made sufficiently high like approximately 30%. Accordingly, the laser output power can be reduced, and this is advantageous for a countermeasure against heat generation and a countermeasure for safety.

Further, where a lamp is used as the light source, if an aperture or the like is not utilized, the light diffusing angle is large (usually approximately 10 degrees to 15 degrees), and in the case of a reflective liquid crystal projector of the single plate type, color mixture occurs and the color purity drops. However, with the reflective liquid crystal projector of the single plate type of the example described above according to the present invention, since the light diffusion angle α can be made sufficiently small like ±1 degree or less as described above, drop of the color purity by color mixture does not occur.

Further, since also the light incident angle upon the projection lens 90 can be made small, a lens having a large F number can be used as the projection lens 90, and the degree of freedom in design of the projection lens 90 increases and reduction in cost of the projection lens 90 can be anticipated.

Furthermore, since black display is implemented not by turning off the laser light beams 1R, 1G and 1B of the individual colors but by intercepting a corresponding display unit of the liquid crystal layer 41 by means of the liquid crystal driving circuit, the image contrast does not drop.

Furthermore, since the light diffusion angle α and the light incident angle ψ can be set small as described above, drop of the contrast caused by oblique incoming of light to the reflective liquid crystal panel 40 can be reduced.

The basic idea of the present invention can be applied also to a liquid crystal projector of the transmission type. In this instance, in FIG. 1, the reflective liquid crystal panel 40 is replaced by a transmissive liquid crystal panel wherein a liquid crystal layer is formed between an incoming side substrate on which a microlens array is formed and an outgoing side substrate on which a liquid crystal driving circuit of the active matrix type is formed such that the laser light beams 3R, 3G and 3B of the individual colors converted into substantially parallel light by the field lens 31 are directly introduced into the transmissive liquid crystal panel, whereupon they are transmitted through the transmissive liquid crystal panel and projected as image light of the colors by means of the projection lens.

However, where the pixel pitch is reduced to raise the definition of the liquid crystal panel, the pixel pitch cannot be set smaller than a diffraction limit corresponding to the wavelength. Therefore, as seen in FIG. 6(A) which illustrates a relationship between transmission regions Ar, Ag and Ab of pixels and spots 4R, 4G and 4B of laser light transmitted through the transmission regions Ar, Ag and Ab in the case of a liquid crystal projector of the transmissive type and FIG. 6(B) which illustrates a relationship between reflection regions Cr, Cg and Cb of pixels and spots 4R, 4G and 4B of laser light reflected by the reflection regions Cr, Cg and Cb in the case of a liquid crystal projector of the reflective type, the reflective liquid crystal projector can use the pixel range more widely than the transmissive liquid crystal projector, and the liquid crystal panel can be formed readily as a high definition liquid crystal panel.

1-2. Second Example

Figure 7:
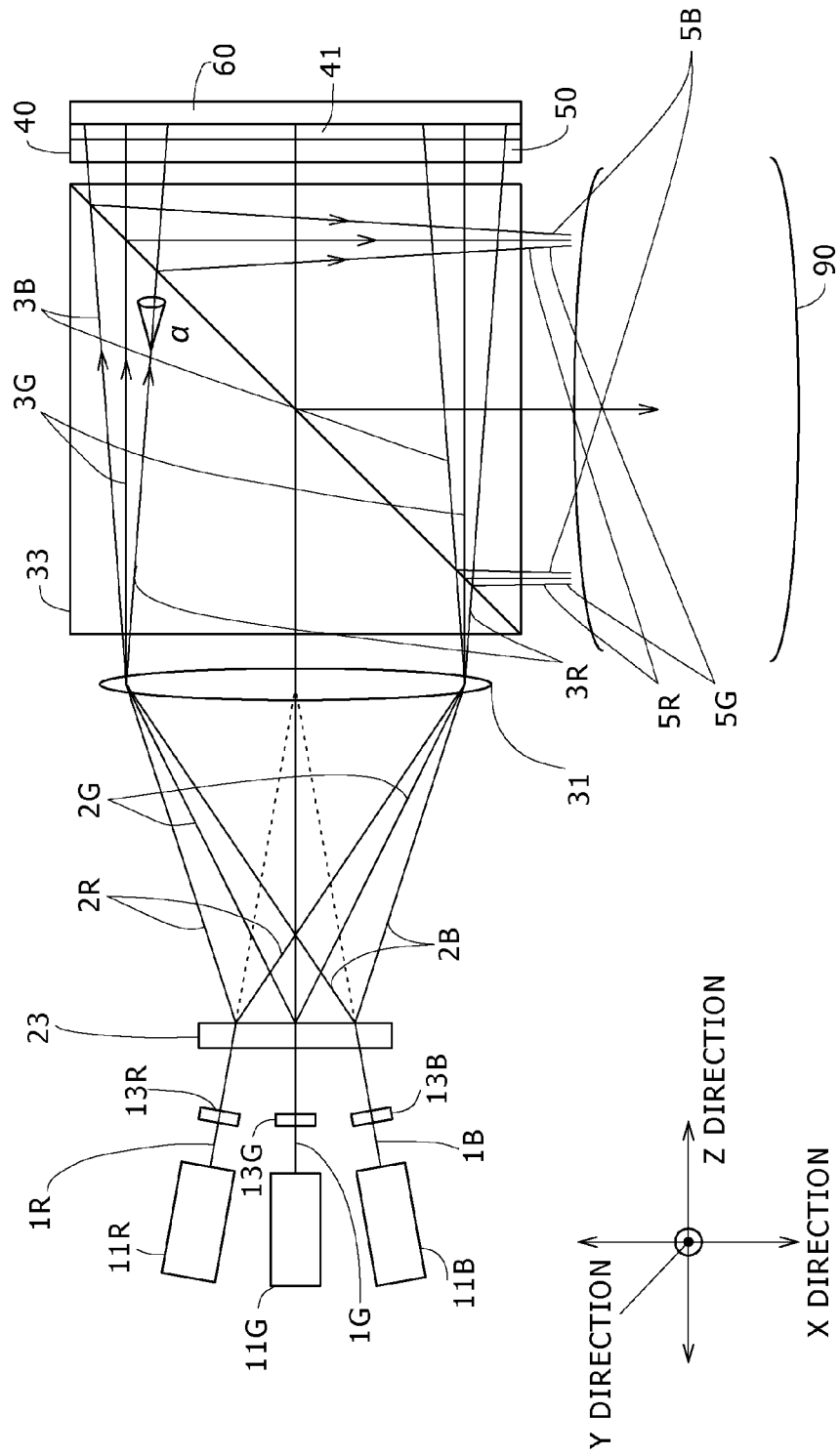
FIG. 7 is a view showing a second example of a reflective liquid crystal projector of the single plate type.

FIGS. 7 and 8

FIG. 7 illustrates a case wherein a refractive optical device is used as the light beam diffusing and shaping optical device as a second example of a reflective liquid crystal projector of the single plate type.

While, also in the present example, the red laser 11R, green laser 11G and blue laser 11B are provided as the light source, in the present example, the lasers 11R, 11G and 11B are disposed such that, for example, the laser light beams 1R and 1B on the opposite sides are inclined individually at predetermined angles with respect to the central laser light beam 1G so that they may be directed to the principal point of the field lens 31.

This is because, in the case of a refractive optical device, different from the case of the diffractive optical device described above, designing of the optical system is facilitated if the central light beam is introduced obliquely so that the center lines of the emerging light beams are aligned with each other. Naturally, the laser light beams 1R, 1G and 1B of the colors may be made parallel to each other similarly as in the example of FIG. 1.

Then, in the present example, a refractive optical device is used as the light beam diffusing and shaping optical device, and the laser light beams 1R, 1G and 1B of the colors emitted from the lasers 11R, 11G and 11B are transmitted, for example, through the λ/2 plates 13R, 13G and 13B, respectively, so as to be introduced into a refractive optical device 23.

A refractive optical device itself is known and can be referred to on the Internet (for example, URL; http://www.r-pcphotonics.com/engineer_diffuser.htm) or the like.

A refractive optical device is composed of microlenses having various shapes and curvatures and gathered together two-dimensionally, and can diffuse and shape a light beam by refraction of the light. The microlenses have different curvatures and radii and having a length of a side of approximately 50 μm, and light incident upon the microlenses is refracted and superposed by the microlenses and shaped finally into a predetermined shape while also the luminance distribution can be uniformized.

While, in the case of a diffractive optical device, very small diffraction patterns formed on the surface form diffraction images and such diffraction light beams are superposed with each other, in the case of a refractive optical device, the microlenses refract incident light beams to condense and diffuse the light beams so as to be superposed with each other thereby to shape the light into a predetermined shape, and also the uniformity of the luminance distribution is obtained.

In the example of FIG. 7, as the refractive optical device 23, a refractive optical device wherein a large number of such microlenses 23a common to the laser light beams 1R, 1G and 1B of the individual colors are formed two-dimensionally on one face side as shown partially in an enlarged scale in FIGS. 8(A) and 8(B) is disposed, and diffuses and shapes the laser light beams 1R, 1G and 1B of the colors such that they enter corresponding pixels of the liquid crystal layer 41 of the reflective liquid crystal panel 40 over the overall area of the display region of the reflective liquid crystal panel 40 as indicated by the laser light beams 2R, 2G and 2B, respectively. It is to be noted that light 9 of FIG. 8(B) illustrates a manner of refraction of light incident upon a certain microlens.

In a refractive optical device, the refractive index depends only upon the diffusion relationship of the material from which the device is formed, and in the visible light region, the refractive index with respect to light beams of the colors are almost equal. Therefore, the refractive optical device 23 can be used commonly to the laser light beams 1R, 1G and 1B of the colors in this manner.

Such a refractive optical device 23 as described above can be designed by a computer simulation and produced using a resin material from a master produced by electrocasting.

The other points such as the point that the field lens 31 is disposed between the refractive optical device 23 and the polarizing beam splitter 33 such that the laser light beams 2R, 2G and 2B of the colors diffused and shaped by the refractive optical device 23 are individually converted into laser light beams of substantially parallel light, the configuration of the reflective liquid crystal panel 40 and so forth are same as those in the example of FIG. 1. Accordingly, also in the present example, quite similar effects to those of the example of FIG. 1 are achieved.

1-3. Example of the Configuration and the Fabrication Method of the Reflection Side Substrate FIGS. 9 and 10

Figure 9:
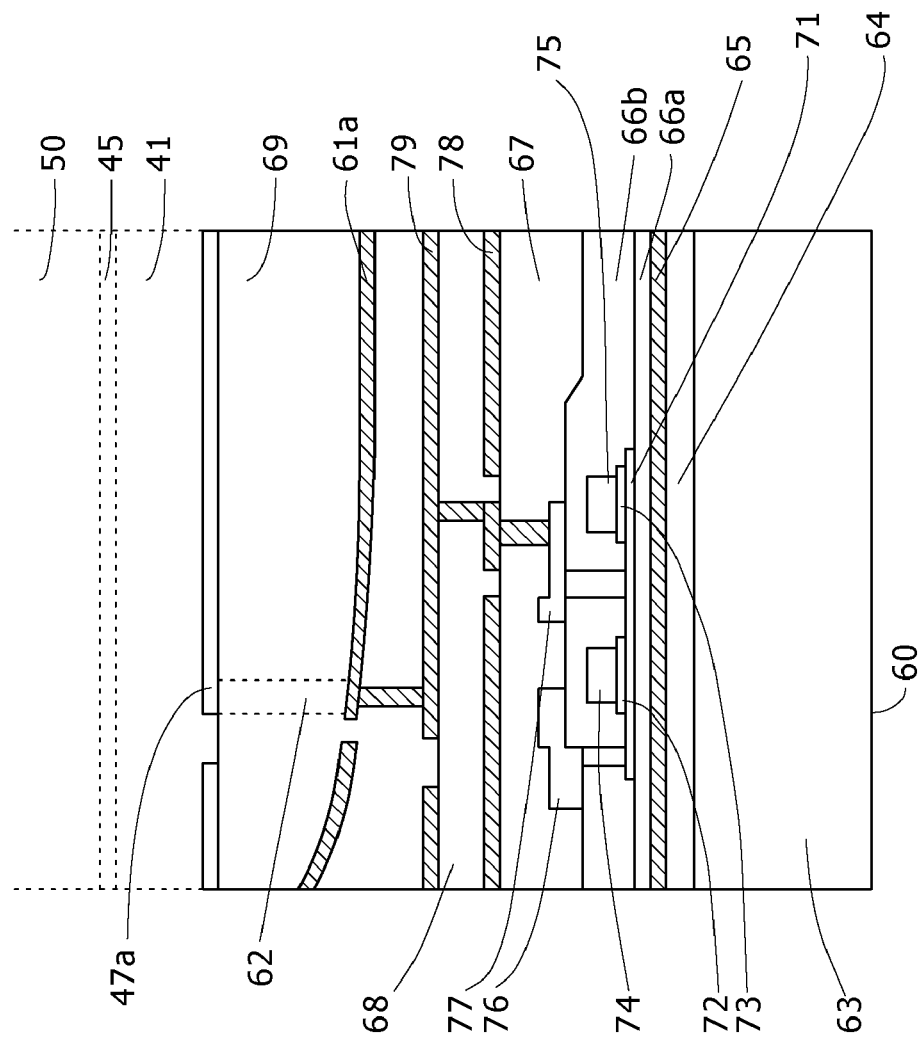
FIG. 9 is a view showing an example of a reflection side substrate of a reflective liquid crystal panel.

The reflection side substrate (backplane) 60 of the reflective liquid crystal panel 40 may basically be any substrate on which a liquid crystal driving circuit of the active matrix type and the reflecting layers 61R, 61G and 61B are formed. As an example, the reflection side substrate 60 may be configured in such a manner as shown in FIG. 9.

In particular, in the present example, a buffer layer 64 made of $SiO_2$ or the like is formed on a support substrate 63 made of quartz or silicon, and a stray light incidence preventing layer 65 made of WSi or the like is formed on the buffer layer 64. Further, an interlayer insulating layer 66a made of $SiO_2$ or the like is formed on the stray light incidence preventing layer 65.

Further, an active layer 71 made of high-temperature polycrystalline silicon or the like is formed on the interlayer insulating layer 66a, and oxide films (thermal oxidation films) 72 and 73 are formed on the active layer 71. Further, a gate electrode 74 is formed on the oxide film 72, and a holding capacitor 75 is formed on the oxide film 73.

Furthermore, an interlayer insulating layer 66b is formed on the interlayer insulating layer 66a, and a signal line 76 and a signal line lead layer 77 made of aluminum are formed on the interlayer insulating layer 66b in a state wherein they are connected to the active layer 71 and an interlayer insulating layer 67 is formed on the interlayer insulating layer 66b.

Further, a black metal layer 78 made of titanium or the like is formed on the interlayer insulating layer 67 in a state wherein it is connected to the signal line lead layer 77, and an interlayer insulating layer 68 is formed on the black metal layer 78. Further, a metal layer 79 is formed on the interlayer insulating layer 68 in a state wherein it is connected to the black metal layer 78.

Further, an interlayer insulating layer 69 is formed on the metal layer 79, and a reflecting layer 61a made of aluminum or the like is formed in the interlayer insulating layer 69 in a state wherein it is connected to the metal layer 79 and a contact hole 62 is formed in the interlayer insulating layer 69. Further, a pixel electrode 47a made of ITO or the like is formed on the interlayer insulating layer 69 in a state wherein it is connected to the metal layer 79 through the inside of the contact hole 62.

The reflection side substrate 60 and the incoming and outgoing side substrate 50 formed in such a manner as described above are disposed with a small gap formed therebetween with the pixel electrode 47a and the opposing common electrode 45 opposed to each other, and liquid crystal is injected between them to form the liquid crystal layer 41.

A TFT circuit may be formed from high-temperature polycrystalline silicon as described hereinabove while the support substrate 63 is made of quartz, or may also be formed from a so-called LCOS wherein the support substrate 63 is made of single crystal silicon. In the case of high-temperature silicon, isolation is not required, and the number of masks is small and reduction in cost is possible. In the case of single crystalline silicon, achievement of higher definition and enhancement of the transistor driving capacity utilizing the LSI technique can be anticipated.

Figure 10:
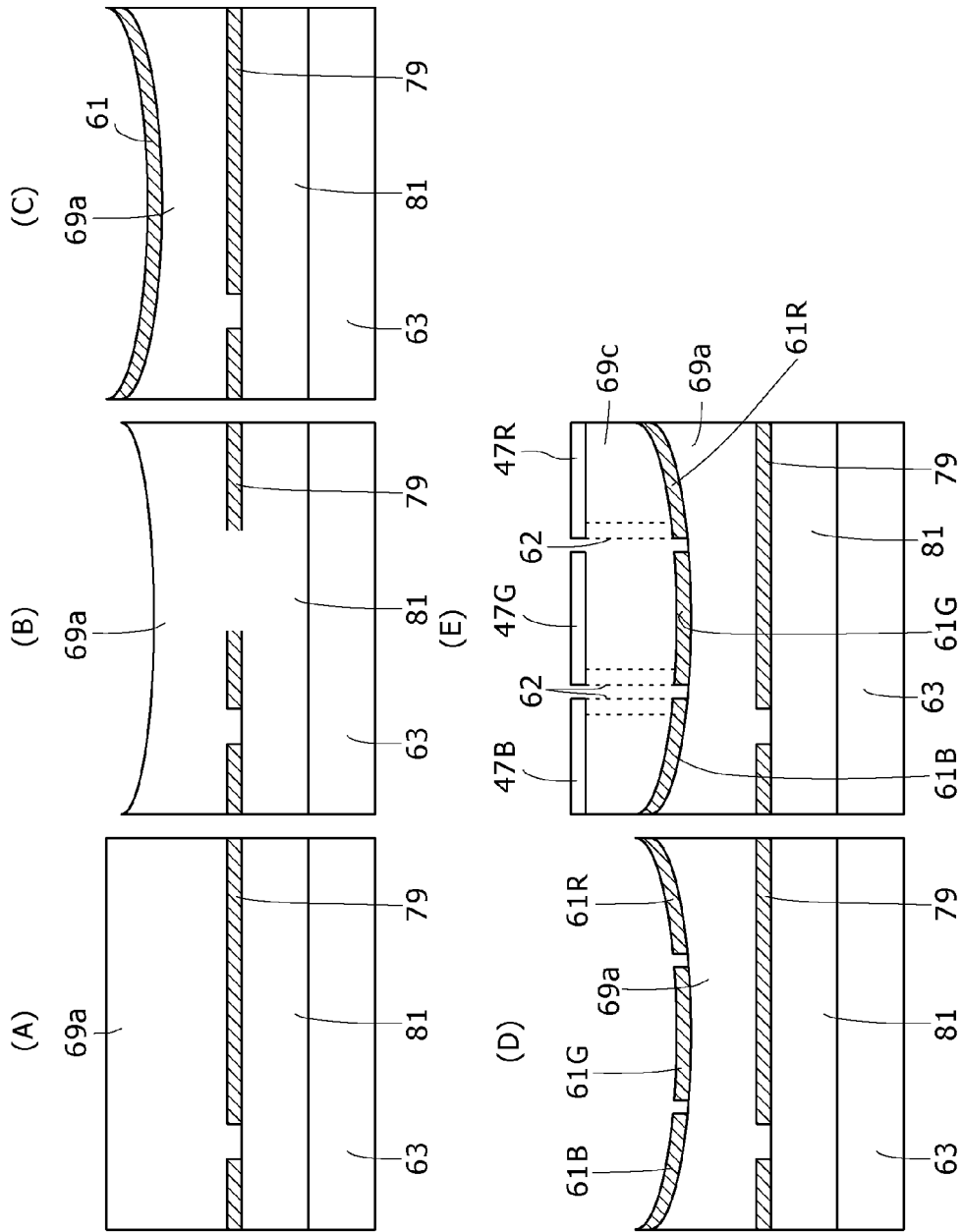
FIG. 10 is a view illustrating an example of a fabrication method of the reflection side substrate.

Such a reflection side substrate 60 as described above is fabricated by a method illustrated in FIG. 10 as an example. In particular, as shown in FIG. 10(A), at first, such a TFT circuit (portion from the buffer layer 64 to the interlayer insulating layer 68 of FIG. 9) 81 as described above is formed on the support substrate 63, and the metal layer 79 is formed on the TFT circuit 81. Further, an interlayer insulating layer 69a which forms a lower layer portion of the interlayer insulating layer 69 described above is formed on the metal layer 79.

Then, the upper face side of the interlayer insulating layer 69a is dry etched into a spherical shape as shown in FIG. 10(B) by lithography by a gray scale method or a multiple mask method. Then, as shown in FIG. 10(C), a reflecting layer 61 is formed over the overall area on the interlayer insulating layer 69a after the etching, and then as shown in FIG. 10(D), part of the reflecting layer 61 is dry etched to form the individual reflecting layers 61R, 61G and 61B.

Then, as shown in FIG. 10(E), an interlayer insulating layer 69c which forms an upper layer portion of the interlayer insulating layer 69 described above is formed on the reflecting layers 61R, 61G and 61B, and the contact hole 62 is formed in the interlayer insulating layer 69c and the individual pixel electrodes 47R, 47G and 47B are formed on the interlayer insulating layer 69c.

1-4. Other Examples of the Optical System

A laser light beam emitted from a semiconductor laser does not have a circular cross sectional shape and disperses at different angles in the vertical direction and the horizontal direction. However, a laser light beam to be introduced into a diffractive optical device or a refractive optical device desirably has a cross sectional shape proximate to a circular shape. Further, a laser light beam emitted from a DPSS laser actually has a considerably small beam diameter.

The light diffusion angle α has a value according to the beam diameter of a laser light beam emitted from a laser, and the light diffusion angle α decreases as the beam diameter decreases. Therefore, where laser light incoming to the reflective liquid crystal panel 40 described above is to be condensed by a microlens 51a and introduced to a corresponding pixel, in order to make the condense light shape as small as possible, it is necessary to reduce the beam diameter of a laser light beam to be emitted from a laser as small as possible.

However, where, for example, in the example of FIG. 1, the diffractive optical devices 21R, 21G and 21B for the colors are formed each as a so-called Diffuser which diffuses diffracted light uniformly in a two-dimensional direction by a periodical pitch, it is necessary to introduce laser light beams into the diffractive optical devices 21R, 21G and 21B individually over a plurality of basic periods, and if the beam diameter of the laser light beam 1G to be introduced to the diffractive optical device 21G for green is excessively small, then diffracted light of green cannot be diffused uniformly in a two-dimensional direction.

Therefore, the beam diameter of the laser light beams 1R, 1G and 1B of the colors to be introduced to the diffractive optical device 21 preferably is approximately 0.5 mm to 1.0 mm. This is because the basic period described above is approximately 0.2 mm in practical use.

Therefore, as the light source section, the laser light beams 1R and 1B emitted from the red laser 11R and the blue laser 11B each formed, for example, from a semiconductor laser are shaped so as to have a beam sectional shape proximate to a circular shape individually by collimation lenses such that, at the position of the diffractive optical device 21, the beam diameter is approximately 0.8 mm and the astigmatism is reduced. Meanwhile, the beam diameter of the laser light beam 1G emitted from the green laser 11G formed from a DPSS laser is increased by a beam expander such that it is approximately 0.6 mm at the position of the diffractive optical device 21.

The red laser, green laser and blue laser can be disposed such that emergent faces (output faces) thereof are extended or arrayed in one direction. By disposing the lasers such that the emergent faces thereof are extended or arrayed in one direction in this manner, it is possible to increase the light amount of the entire lasers of the colors to raise the luminance of the image and reduce speckle noise unique to the lasers. Further, also it is possible to integrate the lasers on one substrate.

Although it is optional which color laser light beam should be positioned at the center, for example, where a Diffuser is used for diffractive optical devices, in order to make the diffraction angle described above large, preferably the blue laser light beam of a short wavelength is positioned centrally, different from the examples shown in the drawings.

It is to be noted that, while the examples of FIGS. 1 and 7 are directed to a case wherein the laser light beams 3R, 3G and 3B of the colors converted into substantially parallel light by the field lens 31 are transmitted through the polarizing beam splitter 33 and introduced to the reflective liquid crystal panel 40 and then reflected by the reflection side substrate 60 of the reflective liquid crystal panel 40, whereafter the image light fluxes 5R, 5G and 5B of the colors emerging from the reflective liquid crystal panel 40 are reflected by the polarizing beam splitter 33 and introduced to the projection lens 90, conversely, it may also be configured and arranged so that the laser light beams 3R, 3G and 3B are reflected by a polarizing beam splitter and introduced to a reflective liquid crystal panel and image light fluxes of the lights reflected by the reflection side substrate of the reflective liquid crystal panel and emerging from the reflective liquid crystal panel are transmitted through a polarizing beam splitter and introduced to a projection lens.

2. Second Embodiment

Figure 11:
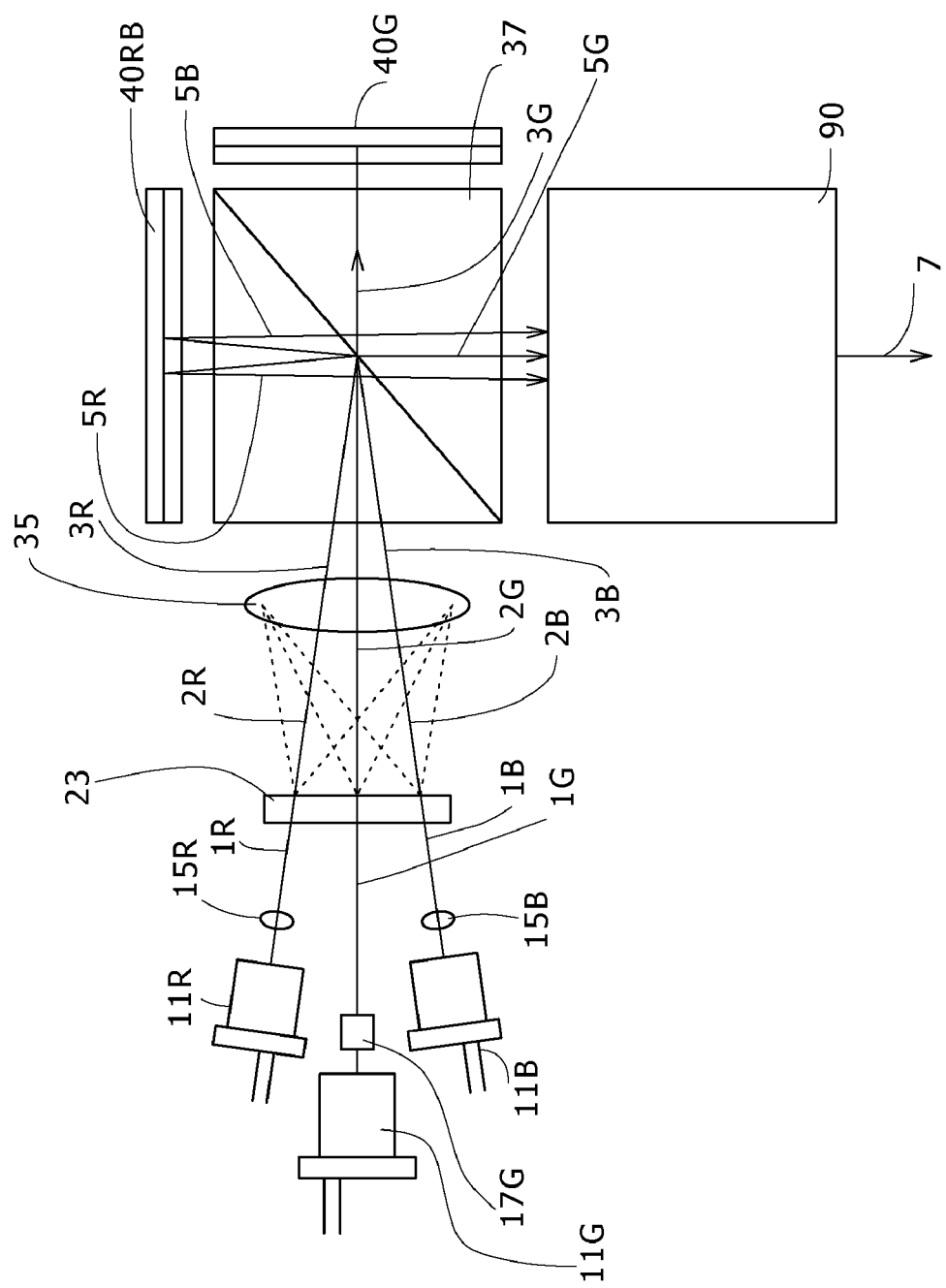
FIG. 11 is a view showing an example of a reflective liquid crystal projector of the double plate type.

(Double-Plate Type): FIG. 11

As a second embodiment, an example of a reflective liquid crystal projector of the double plate type which uses two reflective liquid crystal panels for the three colors of red, green and blue is shown in FIG. 11.

In the present example, the red laser light beam 1R emitted from the red laser 11R formed from a semiconductor laser and the blue laser light beam 1B emitted from the blue laser 11B formed from a semiconductor laser are introduced to the refractive optical device 23 after the cross sectional shape thereof is changed so as to approach a circular shape as described above by collimation lenses 15R and 15B, respectively. Meanwhile, the green laser light beam 1G emitted from the green laser 11G formed from a DPSS laser is introduced to the refractive optical device 23 after the beam diameter thereof is increased as described above by a beam expander 17G.

In this instance, the lasers 11R, 11G and 11B are arranged such that the polarization directions of the red laser light beam 1R and the blue laser light beam 1B and the polarization direction of the green laser light beam 1G will be perpendicular to each other.

Then, the red and blue laser light beams 1R and 1B are diffused and shaped by the refractive optical device 23 such that they are introduced to corresponding pixels over the overall area of the display region of a reflective liquid crystal panel 40RB. Meanwhile, the green laser light beam 1G is diffused and shaped such that it is introduced to the pixels over the overall area of the display region of a reflective liquid crystal panel 40G.

In the reflective liquid crystal panel 40RB, a liquid crystal layer for forming pixels for red and blue is formed between an incoming and outgoing side substrate and a reflection side substrate (backplane), and a microlens array is formed on the incoming and outgoing side substrate while a reflecting layer is formed corresponding to the pixels on the reflection side substrate. While, in the reflective liquid crystal panel 40 shown in FIG. 3 or 4 in the examples of FIGS. 1 and 7, a display unit 49 is formed from a set of pixels Pr, Pg and Pb for red, green and blue, one display unit is formed from a set of red and blue pixels.

In the reflective liquid crystal panel 40G, a liquid crystal layer for forming pixels for green is formed between an incoming and outgoing side substrate and a reflection side substrate (backplane), and a microlens array is formed on the incoming and outgoing side substrate as occasion demands while a reflecting layer is formed corresponding to the pixels on the reflection side substrate. Thus, one display unit is formed from a single pixel.

The laser light beams 2R, 2G and 2B for red, green and blue diffused and shaped by the refractive optical device 23 are converted into laser light beams 3R, 3G and 3B of substantially parallel light by a field lens 35. Further, from among the laser light beams 3R, 3G and 3B, the red and blue laser light beams 3R and 3B are reflected by a polarizing beam splitter 37 and introduced into the reflective liquid crystal panel 40RB. The red and blue laser light beams 3R and 3B are reflected by the reflection layer described above of the reflective liquid crystal panel 40RB such that they go out from the reflective liquid crystal panel 40RB. The green laser light beam 3G is transmitted through the polarizing beam splitter 37 and introduced to the reflective liquid crystal panel 40G, and is then reflected by the reflecting layer described above of the reflective liquid crystal panel 40G and goes out from the reflective liquid crystal panel 40G.

In the reflective liquid crystal panel 40RB, an image signal for red is applied to the pixels for red of the liquid crystal layer to modulate and control the transmission factor of the pixels for red, and an image signal for blue is applied to the pixels for blue of the liquid crystal layer to modulate and control the transmission factor of the pixels for blue.

In the reflective liquid crystal panel 40G, an image signal for green is applied to the pixels (pixels for green, display units) of the liquid crystal layer to modulate and control the transmission factor of the pixels.

Accordingly, image light fluxes for red and blue are obtained as red and blue laser light beams 5R and 5B reflected by the reflecting layer of the reflective liquid crystal panel 40RB and emerging from the reflective liquid crystal panel 40RB, and an image light flux for green is obtained as a green laser light beam 5G reflected by the reflecting layer of the reflective liquid crystal panel 40G and emerging from the reflective liquid crystal panel 40G.

The red and blue laser light beams 5R and 5B are transmitted through the polarizing beam splitter 37 and introduced to the projection lens 90, and the green laser light beam 5G is reflected by the polarizing beam splitter 37 and introduced to the projection lens 90.

Accordingly, multi-color image light 7 is projected on the screen externally of the projector by the projection lens 90, and a multi-color image is shown on the screen.

While the example of FIG. 11 is a case wherein the refractive optical device 23 is used as the light beam diffusing and shaping optical device, also it is possible to use a diffractive optical device similarly as in the example of FIG. 1.

Figure 12:
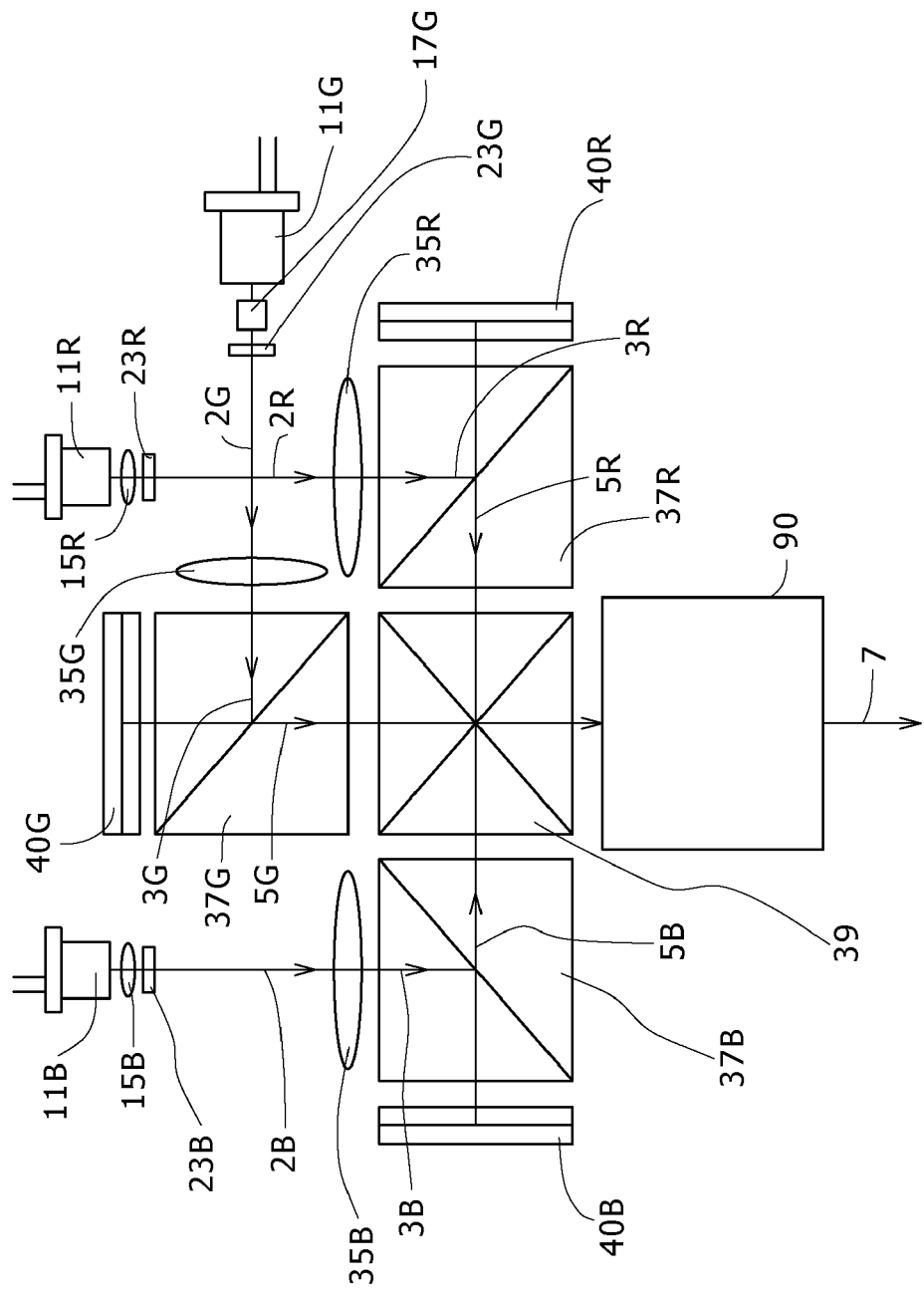
FIG. 12 is a view showing an example of a reflective liquid crystal projector of the triple plate type.

3. Third Embodiment (Triple-Plate Type): FIG. 12

As a third embodiment, an example of a reflective liquid crystal projector of the triple plate type wherein individual reflective liquid crystal panels from each other are used for the three colors of red, green and blue is shown in FIG. 12.

In the present example, after the cross sectional shape of red and blue laser light beams emitted from the red laser 11R and the blue laser 11B is changed so as to approach a circular shape by refractive optical devices 23R and 23B, respectively, the red and blue laser light beams are diffused and shaped by the refractive optical devices 23R and 23B such that they are introduced to the pixels over the overall area of the display region of reflective liquid crystal panels 40R and 40B. Meanwhile, the green laser light beam emitted from the green laser 11G is, after the beam diameter thereof is increased by the beam expander 17G, diffused and shaped by a refractive optical device 23G such that it is introduced to the pixels over the overall area of the display region of the reflective liquid crystal panel 40G.

In each of the reflective liquid crystal panels 40R, 40G and 40B, a liquid crystal layer which forms pixels is formed between the incoming and outgoing side substrate and the reflection side substrate (backplane), and a microlens array is formed on the incoming and outgoing side substrate as occasion demands while a reflecting layer is formed corresponding to the pixels on the reflection side substrate. On each of the reflective liquid crystal panels 40R, 40G and 40B, one display unit is formed from one pixel.

The laser light beams 2R, 2G and 2B for red, green and blue diffused and shaped by the refractive optical devices 23R, 23G and 23B are converted into laser light beams 3R, 3G and 3B of substantially parallel light by field lenses 35R, 35G and 35B, respectively. The laser light beams 3R, 3G and 3B are reflected by polarizing beam splitters 37R, 37G and 37B and introduced to the reflective liquid crystal panels 40R, 40G and 40B, whereafter they are reflected by the reflecting layers of the reflective liquid crystal panels 40R, 40G and 40B and emerge from the reflective liquid crystal panels 40R, 40G and 40B, respectively.

In the reflective liquid crystal panels 40R, 40G and 40B, image signals for red, green and blue are applied to the pixels (display units) of the liquid crystal layers to modulate and control the transmission factor of the pixels.

Accordingly, image light beams for red, green and blue are obtained as the image light fluxes 5R, 5G and 5B for red, green and blue reflected by the reflecting layers of the reflective liquid crystal panels 40R, 40G and 40B and emerging from the reflective liquid crystal panels 40R, 40G and 40B, respectively.

The red and blue laser light beams 5R and 5B are transmitted through the polarizing beam splitters 37R and 37B and transmitted by a cross dichroic prism 39 and then introduced to the projection lens 90 while the green laser light beam 5G is transmitted through the polarizing beam splitter 37G and transmitted through the cross dichroic prism 39 and then introduced to the projection lens 90.

Accordingly, multi-color image light 7 is projected on the screen externally of the projector by the projection lens 90, and a multi-color image is shown on the screen.

Also in the present example, a diffractive optical device can be used in place of each of the refractive optical devices 23R, 23G and 23B.

4. Embodiment as an Image Reproduction Apparatus

FIG. 13

Figure 13:
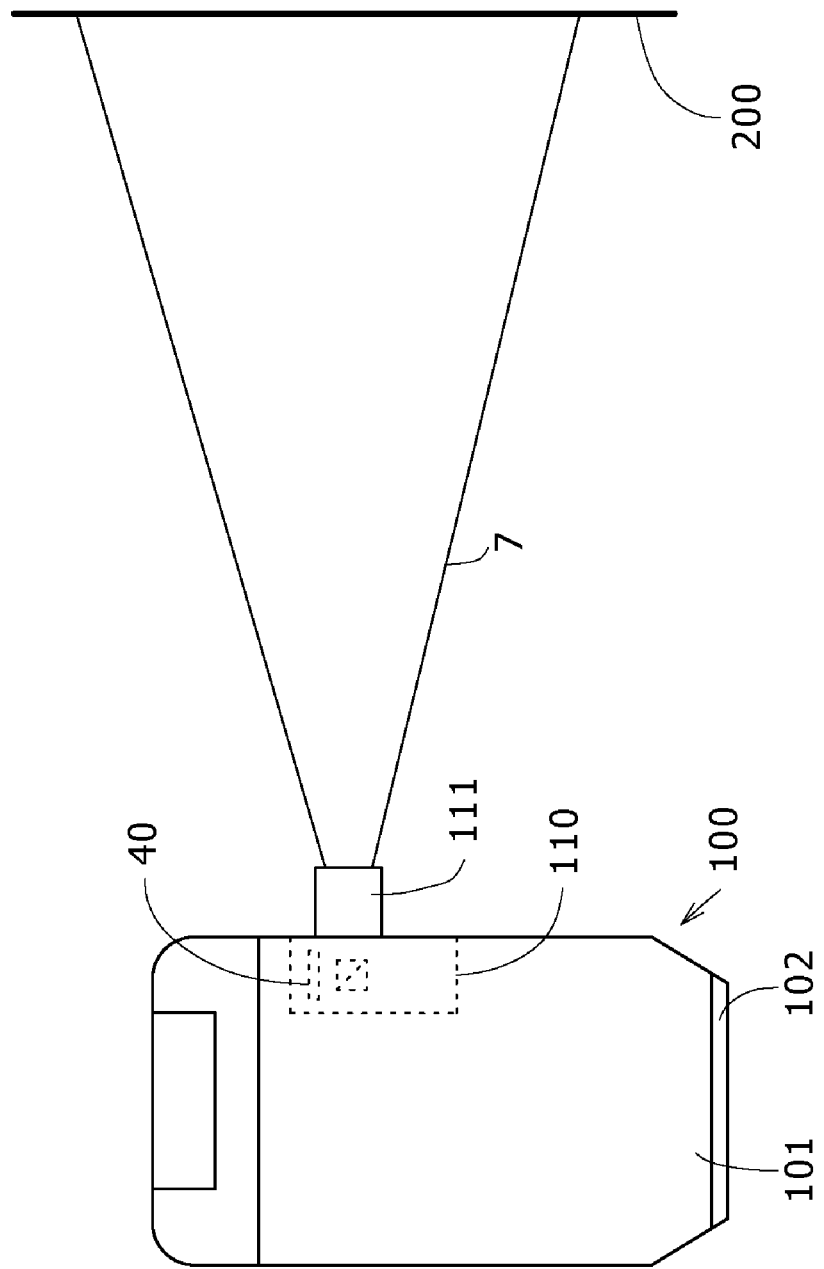
FIG. 13 is a view showing a portable telephone terminal as an example of an image reproduction apparatus of the present invention.

FIG. 13 shows an example of an image reproduction apparatus of the present invention.

In the present example, such a reflective liquid crystal projector 110 of the single plate type as in the example of FIG.

1 or 7 is built as the reflective liquid crystal projector of the present invention in a portable telephone terminal 100.

In particular, the portable telephone terminal 100 is of the foldable type wherein an opening and closing section 101 on which a display such as a liquid crystal display or an organic EL display and a receiver speaker are provided can be opened and closed with respect to a base section 102 on which various keys and a transmitter microphone are provided. For example, the reflective liquid crystal projector 110 is built in one side portion of the base section 102 such that a projection lens section 111 on which the projection lens 90 described hereinabove is provided protrudes sidewardly.

With the portable telephone terminal 100, image data obtained through a portable telephone communication network or by image pickup of an image pickup object by means of a camera built in the portable telephone terminal 100 and recorded in a recording medium such as a semiconductor memory or a hard disk built in the portable telephone terminal 100 or a memory card mounted on the portable telephone terminal 100 is processed by an internal image processing section of the portable telephone terminal 100 and converted into image signals for red, green and blue, which are applied to the reflective liquid crystal panel 40 of the reflective liquid crystal projector 110, whereby multi-color image light 7 can be projected on a screen 200 externally of the portable telephone terminal 100.

As the screen 200, a wall of a room, a top plate of a desk, paper placed on a desk and so forth can be utilized.

The reflective liquid crystal projector of the present invention can be incorporated not only in a portable telephone terminal but also in any apparatus which processes image data recorded in a recording medium (storage device) built therein or mounted thereon to reproduce an image such as a digital camera (digital still camera), a video camera, a mobile computer and a game machine.

The invention claimed is:

1. A reflective liquid crystal projector, comprising:
a light source section having first, second and third lasers, each of which is formed from a semiconductor laser or a solid-state laser, and configured to emit laser light beams of red, green and blue, respectively;
a reflective liquid crystal panel including a liquid crystal layer formed between an incoming and outgoing side substrate and a reflection side substrate and forming pixels for red, green and blue, a microlens array formed on said incoming and outgoing side substrate and comprised of a plurality of microlenses, and reflecting layers formed corresponding to the pixels on said reflection side substrate;
a light beam diffusing and shaping optical device configured to diffuse and shape the laser light beams emitted from said light source section by diffraction or refraction of light such that the laser light beams are introduced to the corresponding pixels of said liquid crystal layer over all of an area of a display region of said reflective liquid crystal panel;
a lens system configured to convert the laser light beams of the colors diffused and shaped by said light beam diffusing and shaping optical device into beams of substantially parallel light;
an optical device configured to transmit or reflect the laser light beams of the colors converted into the beams of substantially parallel light by said lens system so as to introduce the laser light beams of the colors from said incoming and outgoing side substrate to said reflective liquid crystal panel and further introduce the laser light beams of the colors to said liquid crystal layer through said microlenses; and
a projection lens configured to project the image light beams of the colors after (i) being transmitted through said liquid crystal layer, (ii) being reflected by said reflecting layers, (iii) being transmitted through said liquid crystal layer again, (iv) emerging from said incoming and outgoing side substrate through said microlenses and (v) being reflected by said optical device or transmitted through said optical device.

2. The reflective liquid crystal projector according to claim 1, wherein said reflecting layers are curved mirrors having concave faces positioned on spherical phases centered at principal points of the corresponding microlenses and having a radius of a distance equal to or a little smaller than a focal distance of said microlenses, having a same spherical shape and directed toward said microlenses.

3. The reflective liquid crystal projector according to claim 1, wherein said reflecting layers are plane mirrors positioned on spherical phases centered at principal points of the corresponding microlenses and having a radius of a distance equal to or a little smaller than a focal distance of said microlenses and directed toward said microlenses.

4. The reflective liquid crystal projector according to claim 1, wherein each pixel electrode of said reflective liquid crystal panel is electrically connected to a corresponding one of said reflecting layers at a respective corner portion.

5. A reflective liquid crystal projector, comprising:
first, second and third lasers, each of which is formed from a semiconductor laser or a solid-state laser and configured to emit laser light beams of a first color, a second color and a third color, respectively, from among red, green and blue;
a first reflective liquid crystal panel including a liquid crystal layer formed between an incoming and outgoing side substrate and a reflection side substrate and forming pixels of a first color and reflecting layers formed corresponding to the pixels on said reflection side substrate;
a second reflective liquid crystal panel including a liquid crystal layer formed between an incoming and outgoing side substrate and a reflection side substrate and forming pixels of a second color and pixels of a third color, a microlens array formed on said incoming and outgoing side substrate and comprised of a plurality of microlenses, and reflecting layers formed corresponding to the pixels on said reflection side substrate;
a light beam diffusing and shaping optical device configured to diffuse and shape the laser light beams of the first color, second color and third color emitted from said first, second and third lasers by diffraction or refraction of the light such that the laser light beam of the first color is introduced to all of an area of a display region of said first reflective liquid crystal panel and the laser light beams of the second color and the third color are introduced to the corresponding pixels of said liquid crystal layer of said second reflective liquid crystal panel over all of an area of a display region of said second reflective liquid crystal panel;
a lens system configured to convert the laser light beams of the first color, second color and third color diffused and shaped by said light beam diffusing and shaping optical device into beams of substantially parallel light;
an optical device configured to transmit or reflect the laser light beam of the first color converted into the beam of substantially parallel light by said lens system so as to be introduced to said liquid crystal layer of said first reflective liquid crystal panel and reflect or transmit the laser light beams of the second color and third color converted into the beams of substantially parallel light by said lens system so as to be introduced to said liquid crystal layer of said second reflective liquid crystal panel; and a projection lens configured to project (a) the image light of the first color in said first reflective liquid crystal panel after (i) being transmitted through said liquid crystal layer, (ii) being reflected by said reflecting layer, (iii) being transmitted through said liquid crystal layer again, (iv) emerging from said incoming and outgoing side substrate, and (v) being reflected by said optical device or transmitted through said optical device and (b) the image light of the second color and the third color in said second reflective liquid crystal panel after (i) being transmitted through said liquid crystal layer, (ii) being reflected by said reflecting layer, (iii) being transmitted through said liquid crystal layer again, (iv) emerging from said incoming and outgoing side substrate through said microlenses, and (v) being transmitted through said optical device or reflected by said optical device.

* * * * *